MAGNETIC TAPE TRANSDUCER APPARATUS

Original Filed Nov. 16, 1955

22 Sheets-Sheet 1

INVENTORS
Edward F. Kleinschmidt
John W. Ehrlich
Edward E. Podwojski
BY
Strauch, Nolan & Neale
Attorneys Oct. 25, 1966 E. F. KLEINSCHMIDT ETAL 3,281,803

MAGNETIC TAPE TRANSDUCER APPARATUS

Original Filed Nov. 16, 1955 22 Sheets-Sheet 2

INVENTORS
Edward F. Kleinschmidt
John W. Ehrlich
Edward E. Podwojski
BY
Staub, Nolan & Neale
Attorneys INVENTORS
Edward F. Kleinschmidt
John W. Ehrlich
Edward E. Podwojski
BY Strauch, Nolan & Neale
Attorneys

MAGNETIC TAPE TRANSDUCER APPARATUS

INVENTORS
Edward F. Kleinschmidt
John W. Ehrlich
Edward E. Podwojski

BY Strauch, Nolan & Neale
Attorneys

Oct. 25, 1966 E. F. KLEINSCHMIDT ETAL 3,281,803

MAGNETIC TAPE TRANSDUCER APPARATUS

Original Filed Nov. 16, 1955

22 Sheets-Sheet 5

INVENTORS
Edward F. Kleinschmidt
John W. Ehrlich
Edward E. Podwojski

BY Strauch, Nolan & Neale
Attorneys

Oct. 25, 1966 E. F. KLEINSCHMIDT ET AL 3,281,803

MAGNETIC TAPE TRANSDUCER APPARATUS

Original Filed Nov. 16, 1955

22 Sheets-Sheet 6

INVENTOR.
Edward F. Kleinschmidt
John W. Ehrlich
Edward E. Podwojski

BY

Strauch, Nolan & Neale
Attorneys

INVENTORS
Edward F. Kleinschmidt
John W. Ehrlich
Edward E. Podwojski
BY Strauch, Nolan & Neale
Attorneys Oct. 25, 1966 E. F. KLEINSCHMIDT ETAL 3,281,803

MAGNETIC TAPE TRANSDUCER APPARATUS

Original Filed Nov. 16, 1955

22 Sheets-Sheet 8

INVENTORS
Edward F. Kleinschmidt
John W. Ehrlich
Edward E. Podwojski

BY

Strauch, Nolan & Neale
Attorneys

INVENTORS
Edward F. Kleinschmidt
John W. Ehrlich
Edward E. Podwojski

BY Strauch, Nolan & Neale
Attorneys

Oct. 25, 1966 E. F. KLEINSCHMIDT ET AL 3,281,803

MAGNETIC TAPE TRANSDUCER APPARATUS

Original Filed Nov. 16, 1955 22 Sheets-Sheet 10

INVENTORS
Edward F. Kleinschmidt
John W. Ehrlich
Edward E. Podwojski

BY Strauch, Nolan & Neale
Attorneys

Oct. 25, 1966 E. F. KLEINSCHMIDT ETAL 3,281,803

MAGNETIC TAPE TRANSDUCER APPARATUS

Original Filed Nov. 16, 1955 22 Sheets-Sheet 11

INVENTORS
Edward F. Kleinschmidt
John W. Ehrlich
Edward E. Podwojski

BY Strauch, Nolan + Neale
Attorneys

INVENTORS
Edward F. Kleinschmidt
John W. Ehrlich
Edward E. Podwojski
BY
Strauch, Nolan + Neale
Attorneys

MAGNETIC TAPE TRANSDUCER APPARATUS

Original Filed Nov. 16, 1955

INVENTORS
Edward F. Kleinschmidt
John W. Ehrlich
Edward E. Podwojski
BY
Staub, Nolan & Neale
Attorneys INVENTORS
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski BY Strauch, Nolan + Neale
Attorneys INVENTORS
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski
BY
Strauch, Nolan & Neale
Attorneys INVENTORS
Edward F Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski
BY
Strauch, Nolan + Neale
Attorneys INVENTORS
Edward F. Kleinschmidt
John W. Ehrlich
Edward E. Podwojski
BY Strauch, Nolan + Neale
Attorneys

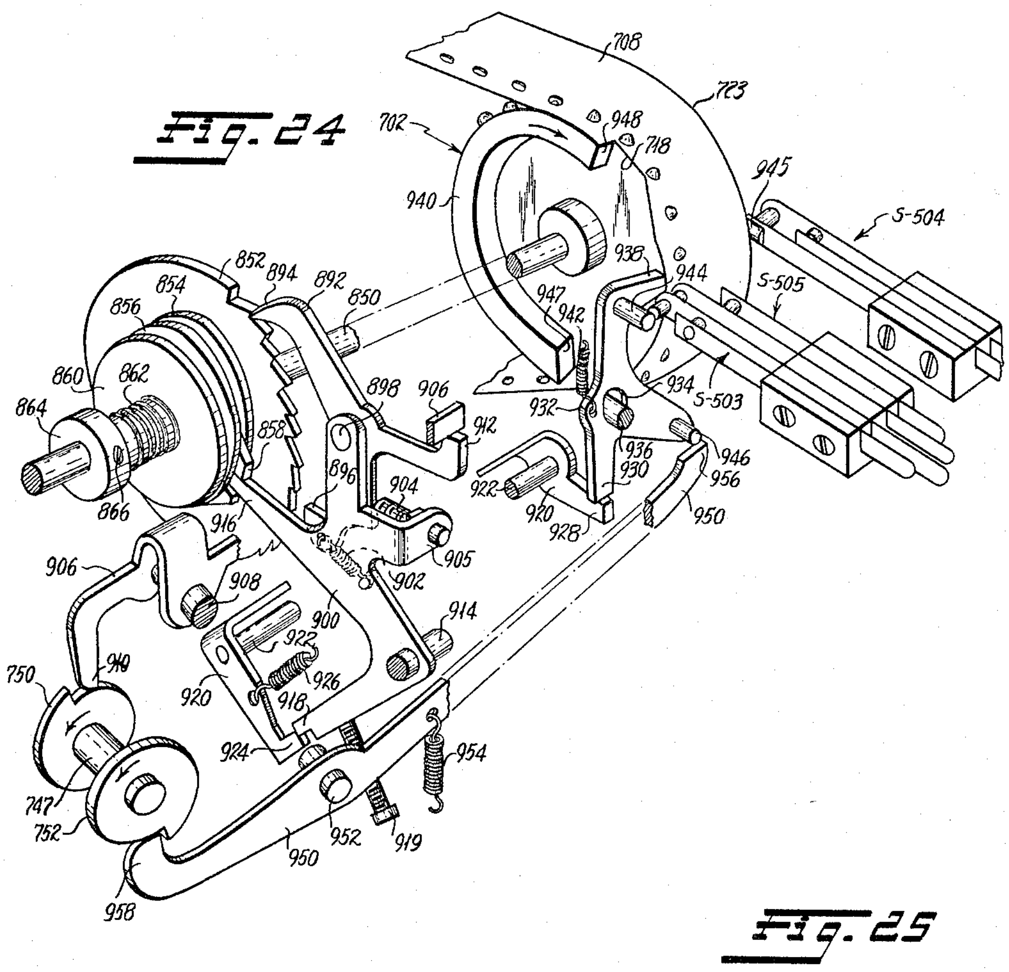
FIG. 24 FIG. 25
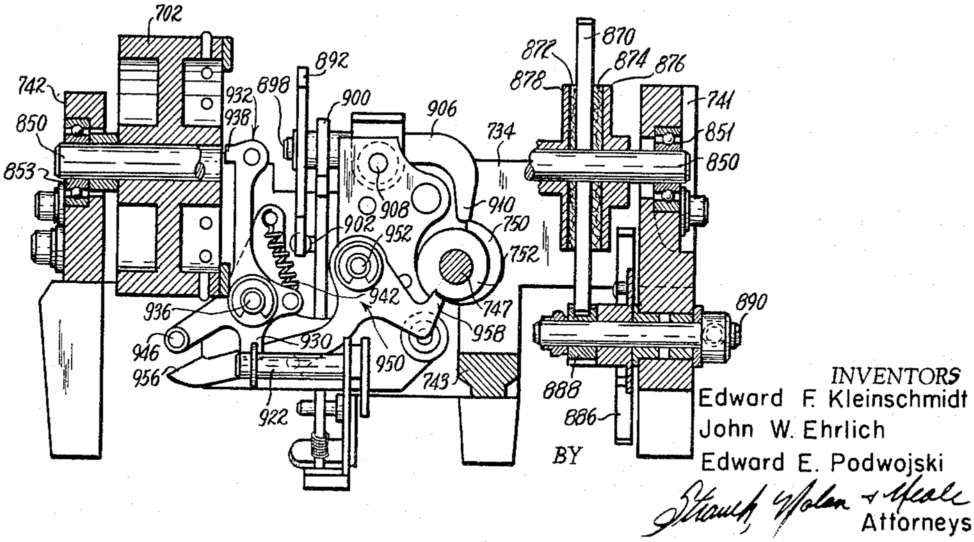
INVENTORS
Edward F. Kleinschmidt
John W. Ehrlich
Edward E. Podwojski
BY
Strauch, Nolan & Neale
Attorneys

United States Patent Office 3,281,803
Patented Oct. 25, 1966

3,281,803

MAGNETIC TAPE TRANSDUCER APPARATUS

Edward F. Kleinschmidt, Wilmette, and John W. Ehrlich, Glenview, Ill., and Edward E. Podwojski, Santa Barbara, Calif., assignors to SCM Corporation, a corporation of New York Original application Nov. 16, 1955, Ser. No. 547,265, now Patent No. 3,009,988, dated Nov. 21, 1961. Divided and this application July 26, 1961, Ser. No. 126,916
9 Claims. (Cl. 340—174.1)

This application is a division of application Serial No. 547,265, filed November 16, 1955, and now United States Patent No. 3,009,988.

The present invention relates to improvements in message communication equipment of the type that is operative to produce a legible record of messages transmitted and recorded and particularly to improvements in the storage unit of such equipment rendering it lighter in weight, more compact in construction, and otherwise adapted for use in aircraft.

Heretofore, communication equipment of this type has been generally unsuitable for use in aircraft due to its over-all weight and bulk and due to its structural arrangement by which the units, such as the keyboard and printing units, which of necessity must be located in positions accessible to the operator, were themselves large and bulky and inseparably associated with other bulky components of the over-all equipment, constant access to which was not needed by the operator resulting in crowding of the operator's compartment unnecessarily and in certain types of aircraft rendering the previously known conventional telecommunication equipment unusable due to lack of the requisite space requirements in the operator's compartment. For these reasons, use of conventional equipment of this type has been largely confined to large shipboard and ground installations and therefore, advantages of such equipment in providing a constant monitor of a selected radio communication channel without operator attendance and of providing an accurate record of all messages transmitted and received, have heretofore been largely denied to aircraft communications.

In addition to the foregoing difficulties with the conventional telecommunications equipment of this type, there are additional functional limitations which render such previously known equipment unsuitable for aircraft use, particularly for military and naval aircraft.

The storage unit of the present invention, although quite versatile in use with other equipment, was developed in connection with the airborne communication organization fully described in the aforesaid application, hence its operation and control aspects will be described in connection with the over-all organization.

The printer portion of the over-all organization provides, with its control matrix, a new telegraph receiver of the page printing type wherein the only portion of the operating mechanism located in front of the page upon which the message is to be printed is a printing hammer, although the mechanism can be modified to be used with an ink ribbon if so desired, e.g., the ribbon can be carried by the hammer mechanism. The preferred embodiment utilizes commercially available special black surfaced paper, the black surface being treated with a light colored material. When the hammer strikes the surface material and forces the paper against the selected character of the typewheel located immediately behind the paper in line with the hammer, the portion of the treated material over the raised letter on the typewheel is broken, leaving a visual substantially black manifestation of the raised character. This manner of visual character recording is unaffected by temperature variations.

The typewheel character selection is accomplished through a novel extremely lightweight controlled stop mechanism coordinated with the shaft upon which the typewheel is fixed. This includes a toothed stop wheel, rotatable with the typewheel shaft, having a plurality of stop positions determined by the engagement of a solenoid controlled pawl with individual stop wheel teeth. The stop mechanism uses two such solenoid controlled pawls so positioned around the periphery of the stop wheel that one pawl will engage and stop the stop wheel at a position intermediate the positions at which the other pawl engages and stops the stop wheel. Thus the number of angular selections of typewheel rotation can be controlled by energization of one of the two solenoids at selected rotational positions of the typewheel shaft. Energization of the solenoids at precise positions of shaft rotation is accomplished through printed commutator circuits disposed adjacent each end of the typewheel shaft, each commutator circuit controlling one solenoid and, through its associated pawl, one half of the characters on the typewheel. Through a receiving matrix in the control circuit, one or the other of the commutators will control its respective solenoid for each code combination fed into the circuit. Use of the electrical selecting mechanism rather than a mechanical permutating code member selecting mechanism contributes in a large manner to the light weight of this printer.

The roll of page material is located on the rear side of the printer unit and feeds down behind, under and up in front of the typewheel shaft and typewheel and up over a feed roller. Through a new power mechanism which includes a novel positive action clutch driving a function shaft which in turn, through a friction clutch, drives the typewheel shaft, the apparatus can initiate line return or line feed movements at any spaced position of the typewheel, and the line return function may be so controlled to simultaneously initiate a line feed function or initiate only a line return function.

A further component of the complete set, the keyboard, in general form is similar to a standard teletypewriter keyboard although it is modified in several of the mechanisms. The keyboard may be used selectively to control the transmission of messages or to control the storage of message signals for future transmission, a printed record being made of the mesage in either event. Although, if necessary, the keyboard can be arranged to accommodate a larger number of character representations, the preferred and disclosed embodiment is arranged for transmission of signals indicative of the twenty-six characters of the alphabet, plus line return, line feed, letters and space.

Signal devices are included as components of the keyboard unit to enable the operator to visually determine several limit conditions of the complete set, i.e., the approach of the end condition of the magnetic tape in the tape recorder (the storage device of the present invention) and the approach of the end of line position on the page printer. These signal devices are lamps which when illuminated indicate the above two conditions. Although the page printer of this set will automatically initiate the return and line feed, the operator, using proper sending technique, should send a line return and line feed signal at the end of each line, hence the need for an indicator to inform the operator when such position is being approached. In a conventional manner, this transmitter utilizes five notched code bars actuated by the transmitter keys. Depending on the character key depressed, the five code bars are moved into a predetermined permutation, each bar moving either to the right or left side. Each code bar is associated with a pair of contacts and when moved to the right the bar will cause its set of contacts to close, conversely when moving to the left the bar will cause the contacts to be opened. Closed contacts represent mark impulses and open contacts represent space impulses. Thus each key will operate the code bars to provide a particular combination of five signals represented by the condition of the five code bar switches. The keyboard prepares the contacts for a simultaneous five unit signal combination that is fed through five separate line circuits to the main control unit circuit.

Immediately behind or parallel with the five code bars is a universal bar that always shifts in one direction whenever a key or the space bar is depressed and enables a code bar locking wedge to be biased into locking cooperation with the five code bars and the universal bar. Movement of the locking wedge into locking position prevents a resetting of the code bars and closes a sixth set of contacts. This action occurs each time a key is depressed, except as hereinafter described for repeat blocking. Due to a built-in mechanical time delay, the code bar contacts are completely set before the universal bar contact circuit is energized through actuation of the sixth set of contacts by the locking wedge. This enables the five unit code combination to be completely integrated into the control circuit before the control circuit electronic matrix is operated to transmit the code signal. The universal bar wedge actuated contacts initiate the control circuit operation to transmit the code signal in the manner desired and determined by the operator. Such control circuit operation, subsequent to code transmission, actuates a code bar locking wedge solenoid to release the locking wedge and enable the next key to be depressed which reshifts the code bars and universal bar to repeat the transmitting operation.

Incorporated on the universal bar is a novel repeat blocking device that cooperates with the locking wedge to prevent the wedge from relocking if any key is held in a depressed position which positively retains the universal bar in its shifted position. If the locking wedge cannot move to locking position its contacts cannot be closed and the control circuit will be inoperative for the combination of signal impulses represented by the code bar contacts. Release of the depressed key will permit the universal bar to shift back to its normal position and the repeat blocking device becomes inoperative.

Repeat blocking is inoperative upon space bar operation because the space bar has its own transmitter operating contacts in a circuit parallel to those of the wedge actuated contacts. If the space bar is depressed and held down the transmitter will repeat the combination of signals representing a space until the space bar is released.

Also included as part of the airborne teletypewriter apparatus is the novel magnetic tape recorder unit or storage unit in which messages to be transmitted may be stored and then transmitted at a subsequent time. The recorder unit according to the invention is adapted to be located at a remote position in the aircraft to conserve space around the operator and is completely unattended at all times. In view of the intended operational environmental conditions, the recorder unit according to the present invention is provided with a minimum number of parts, has minimum weight and is ruggedly constructed to be capable of operation even when subjected to large acceleration forces.

Accordingly, a primary object of the present invention resides in the provision of a novel compact magnetic data storage device operative to intermittently advance a magnetic record through a recording station and selectively operative to record or sense a group of signals extending transversely of the path of movement of such magnetic record.

A further object of the invention is to provide a recorder unit which is selectively connectable to the keyboard and to the printer and transmitter in the teletypewriter apparatus whereby a message to be transmitted may optionally be entered in the recorder and subsequently played back from the recorder at any desired time to operate the transmitter thereby making the rate of message transmission completely independent of the skill of the operator. This enables each message to be transmitted in the shortest possible time while permitting the operator to initially record the message at any desired rate.

Another object of the invention is to provide a recorder unit which is adapted for remote operation and which requires no personal attention other than periodic maintenance checks.

A further object of the invention is to provide a simplified recording tape drive for the recorder unit which does not require auxiliary driving means for the take-up reels thereby keeping the weight and complexity of the recording apparatus to a minimum.

It is a still further object of the invention to provide a recorder unit utilizing steel tape as recording medium thereby providing reliable operation and eliminating all danger of breakage of the recording tape.

Another object of the invention is to provide an improved recording system utilizing high density storage of data thereby providing a maximum storage capacity in a minimum volume.

Still another object of the invention is to provide a novel method and system for recording on magnetic tape where the data is stored serially in a direction transverse to the length of the tape and the tape is subjected to a lengthwise intermittent movement between recording operations.

A still further object of the invention is to provide a recording system where data is stored in a plurality of channels spaced side by side and the recording and reading operation is effected by means of a single recording head.

Another object of the invention is to provide a tape sensing means in the recorder unit requiring a minimum number of auxiliary components for signalling the operator at a remote position when either end of the tape approaches the recording head.

Still another object of the invention is to provide, under direct control of the tape, both electrical and mechanical interlocks to prevent the tape from being completely unwound from either the feed or take-up reel.

Still another object of the invention is to provide a novel mechanism for coordinating the operation of the recording head and the tape advance.

A still further object of the invention is to provide a novel tape control mechanism for controlling the operation of the tape during the rewind and playback or record operations.

These and other objects of the present invention will become more fully apparent by reference to the appended claims and as the following detailed disclosure proceeds with reference to the accompanying drawings wherein:

Figures 2, 3, 4, 5, 6, 7, 8, 9, 10, 11, 12, 13:
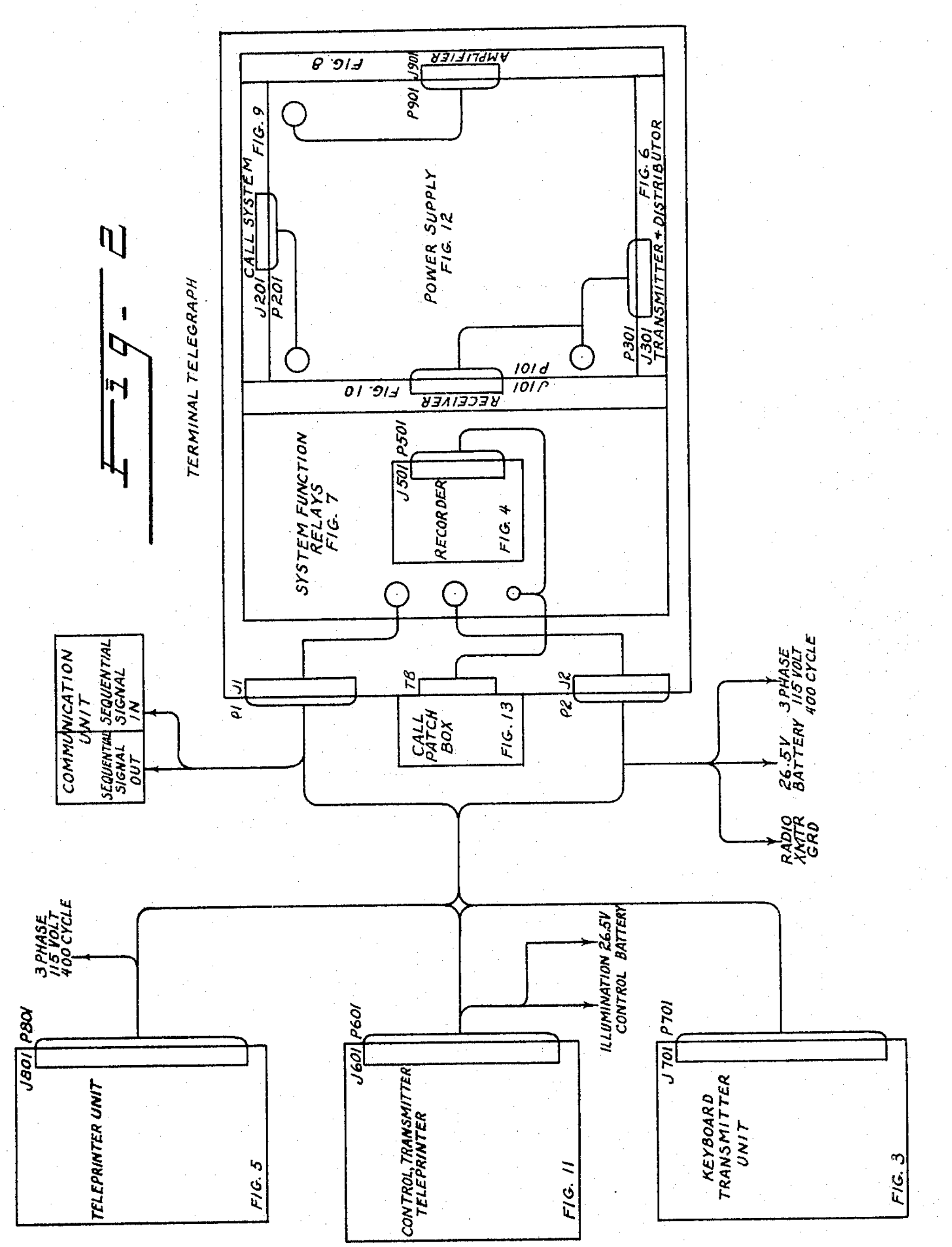
FIGURE 2 is a block diagram of the circuit arrangement of the communications equipment.
FIGURE 3 is a schematic wiring diagram of the keyboard unit.
FIGURE 4 is a schematic wiring diagram of the circuitry directly related to the storage unit mechanism of the present invention.
FIGURE 5 is a schematic diagram of the printer unit.
FIGURE 6 is a schematic wiring diagram of the transmitter and distributor circuit.
Figure 3:
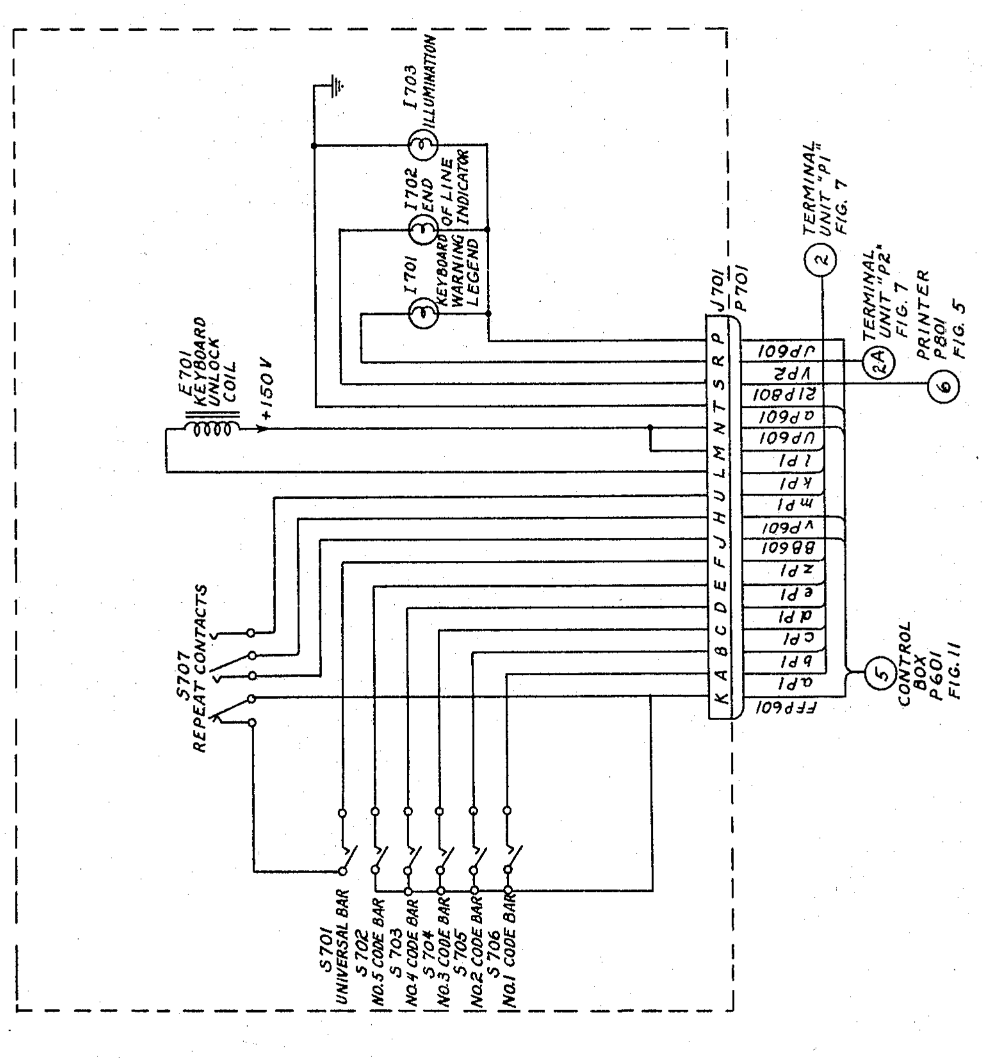
Figure 4:
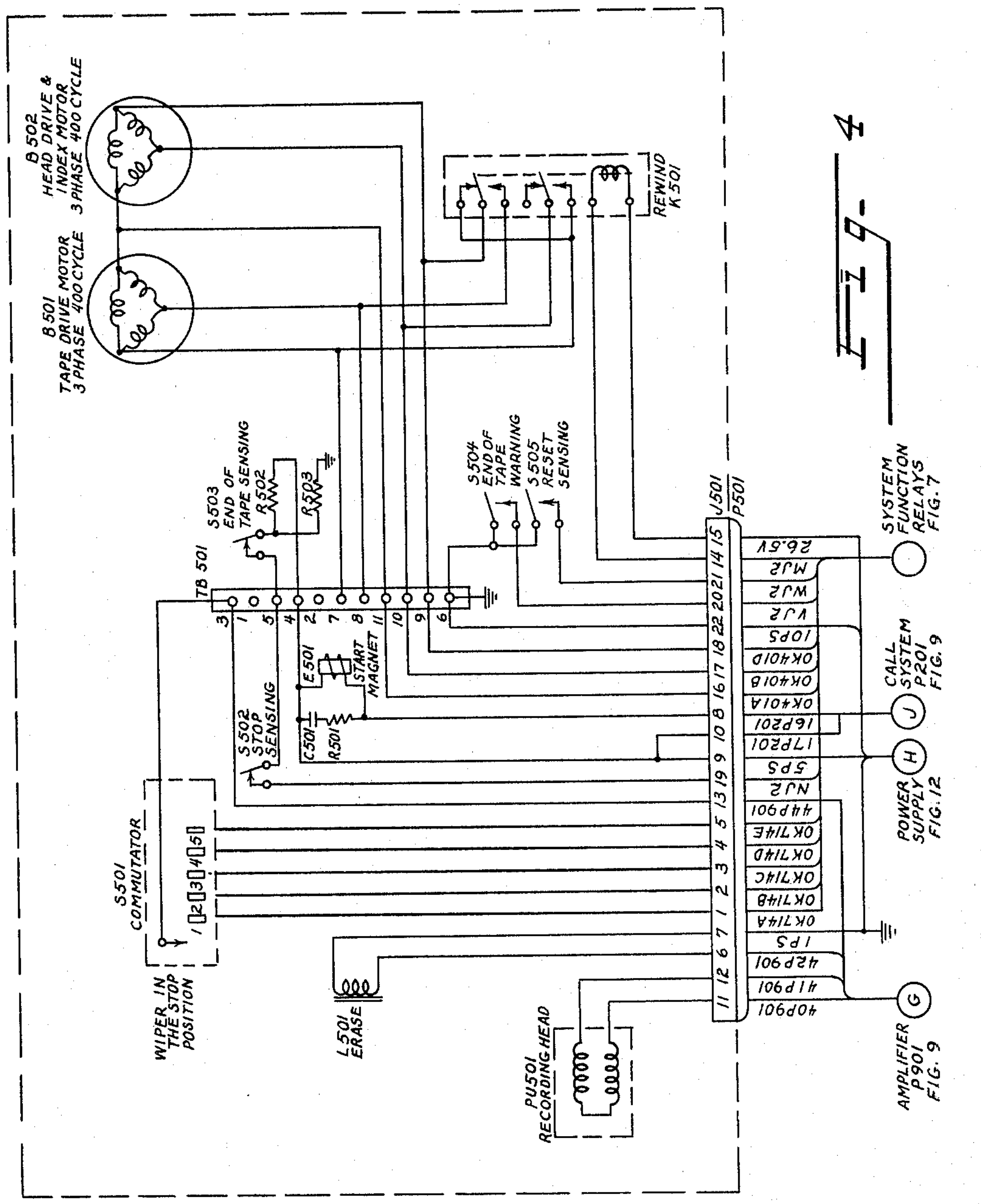
Figure 5:
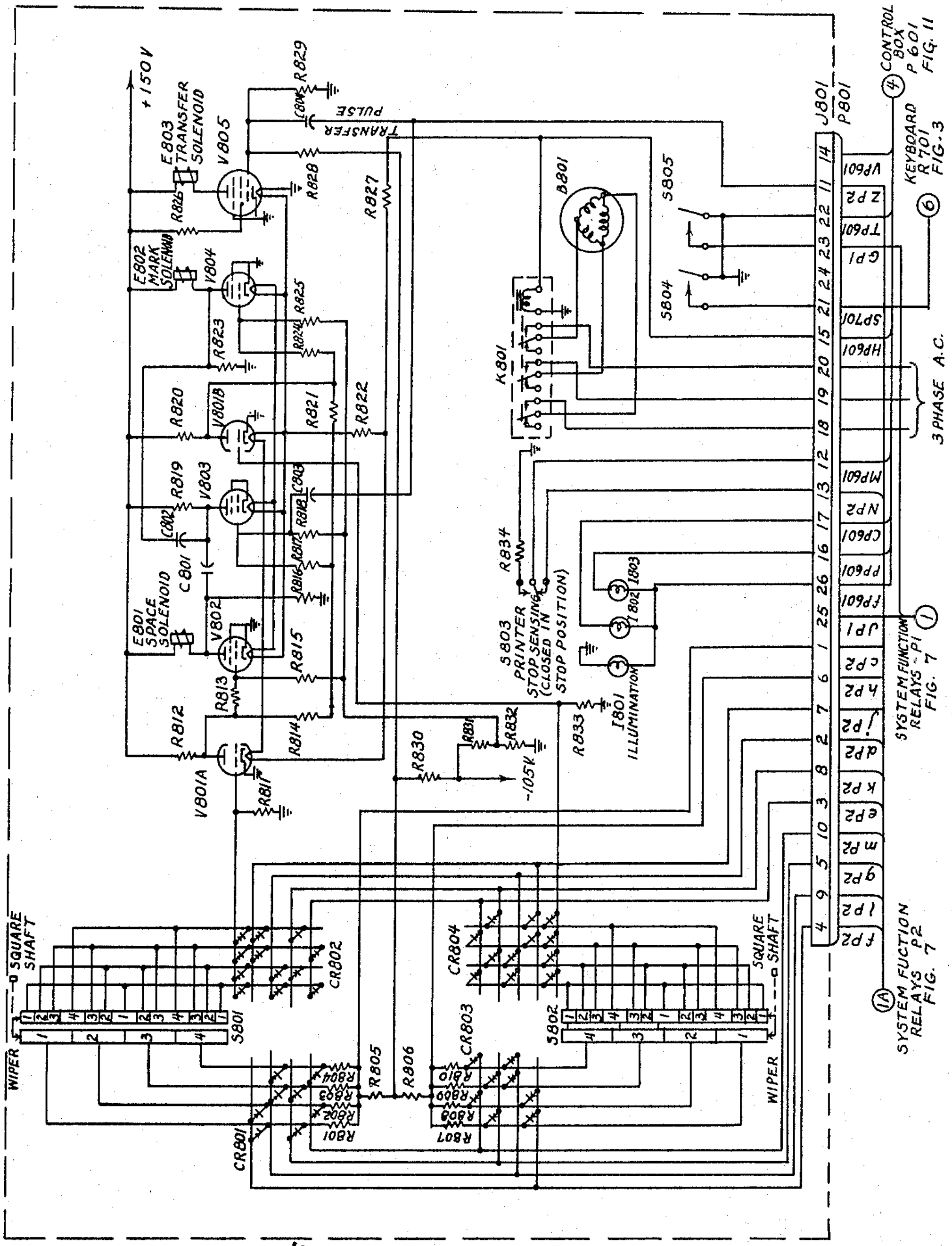
Figure 6:
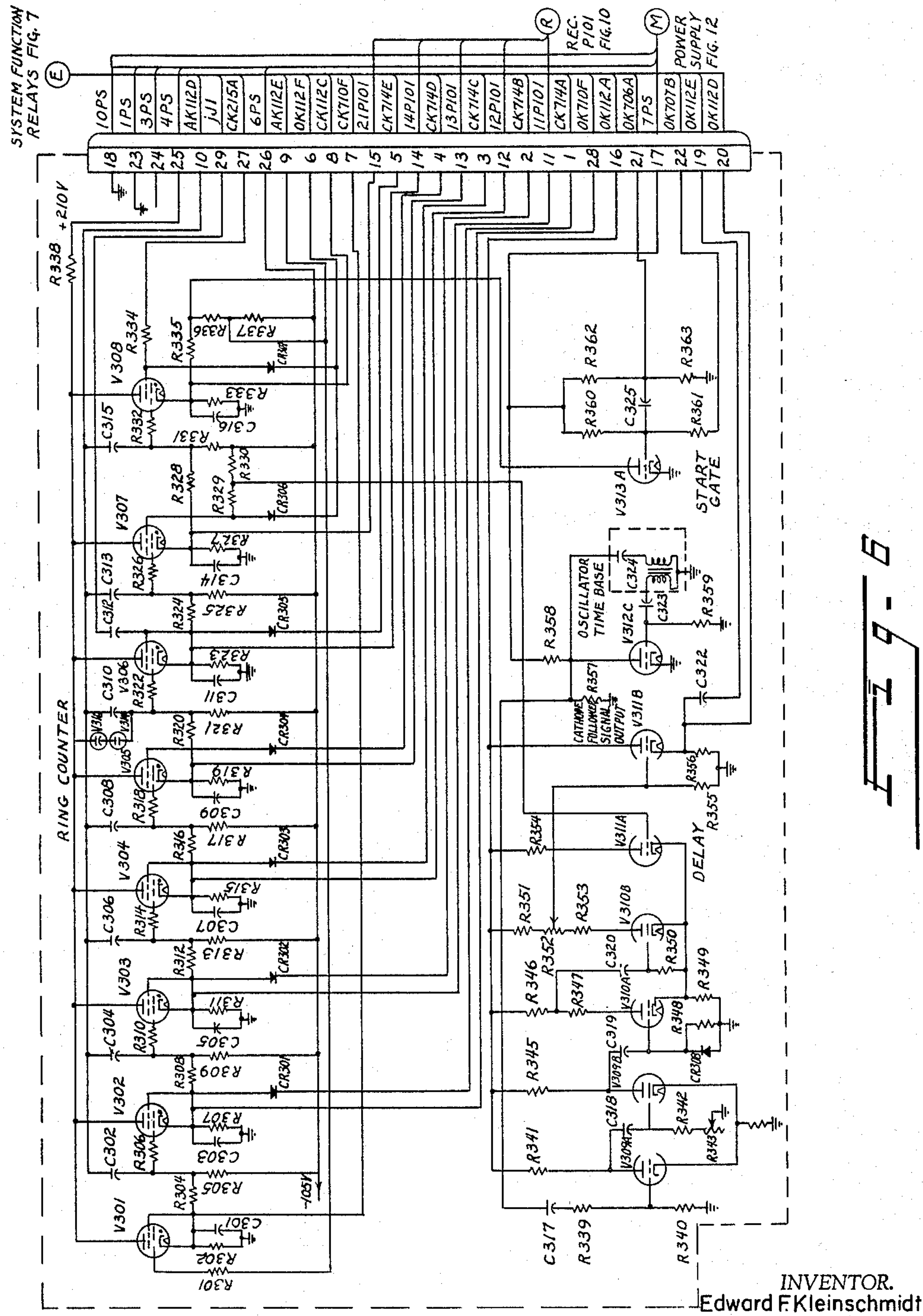
Figures 17, 26:
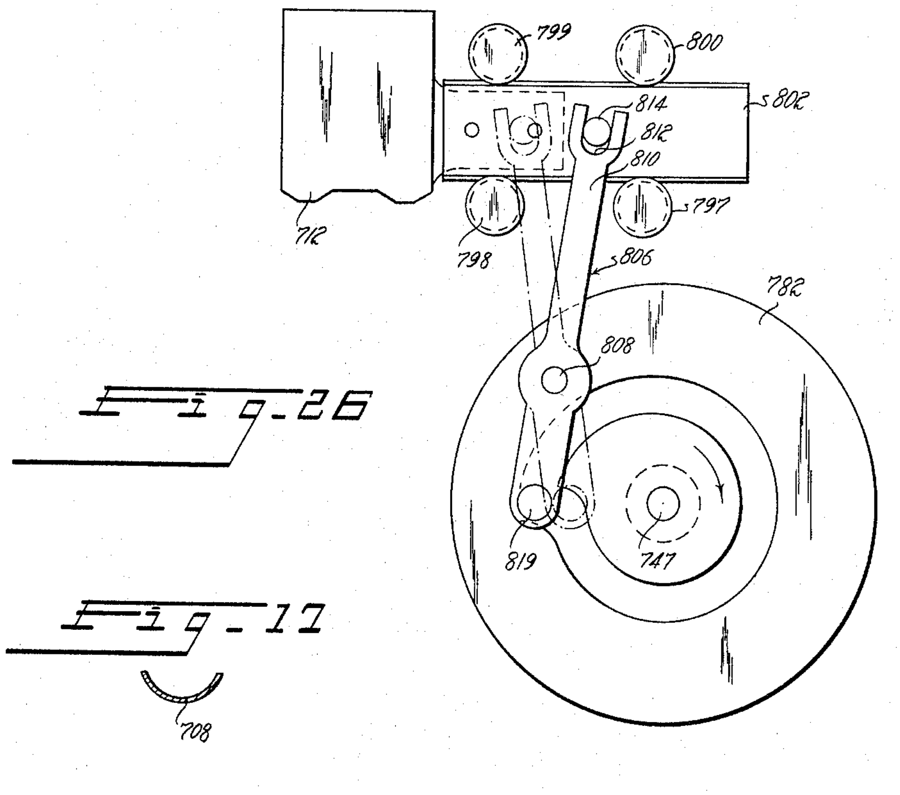
Figures 13, 16:
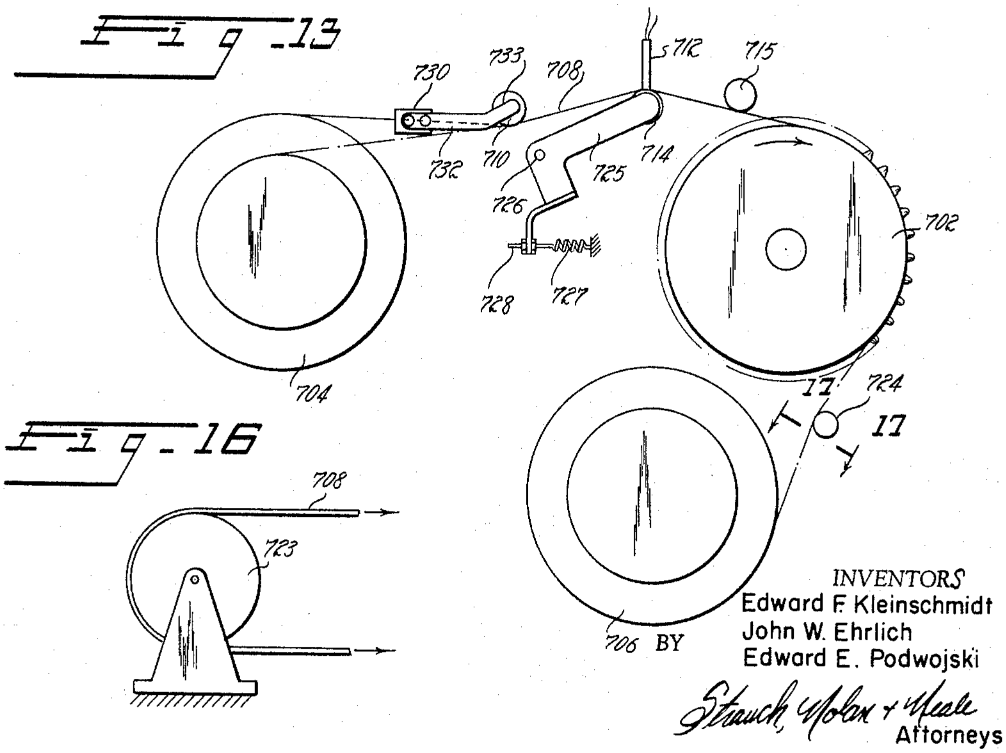
Figures 14, 22:
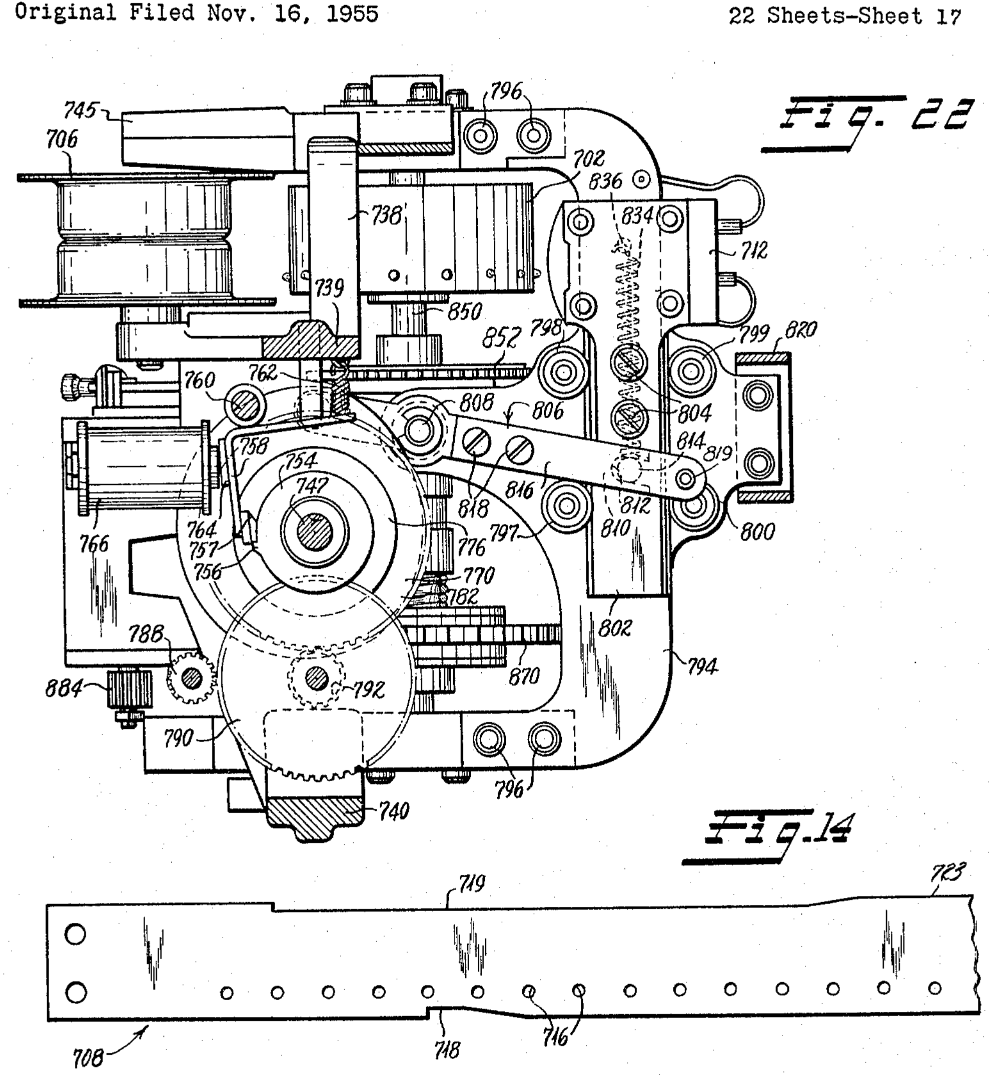
Figure 15:
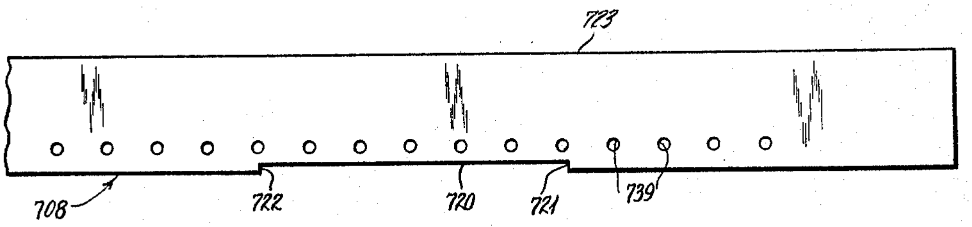
Figure 18:
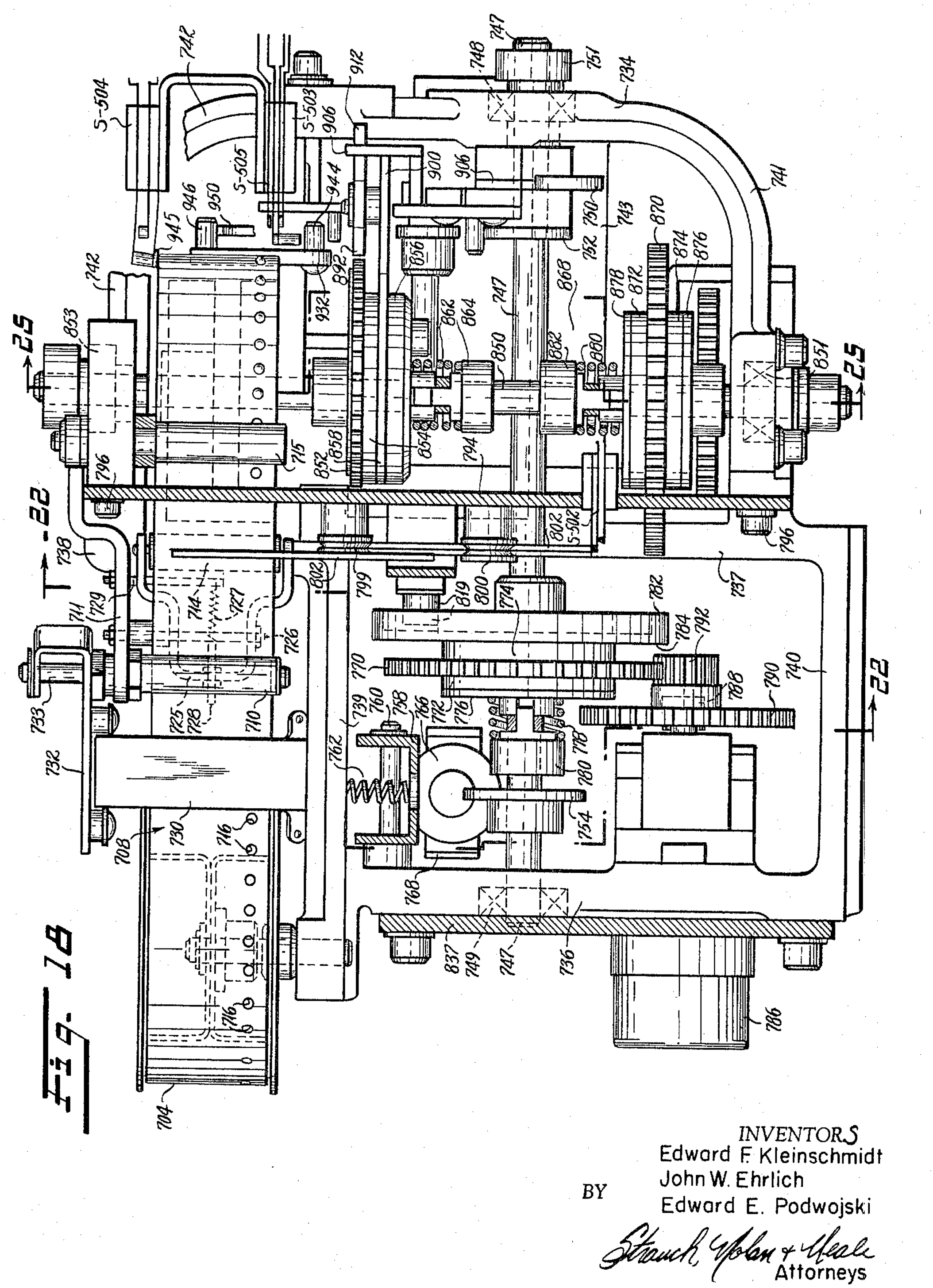
Figures 19, 23:
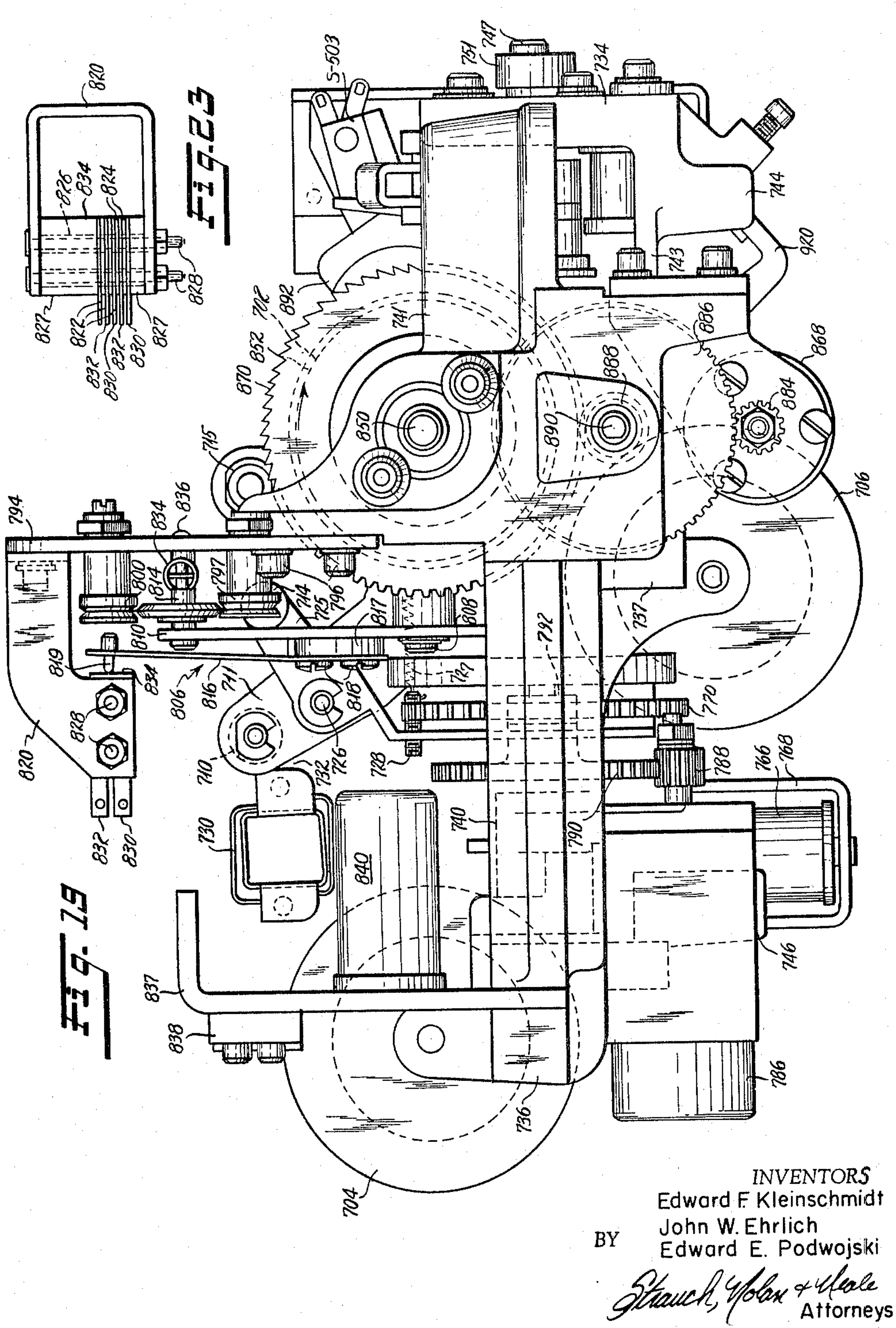
Figure 20:
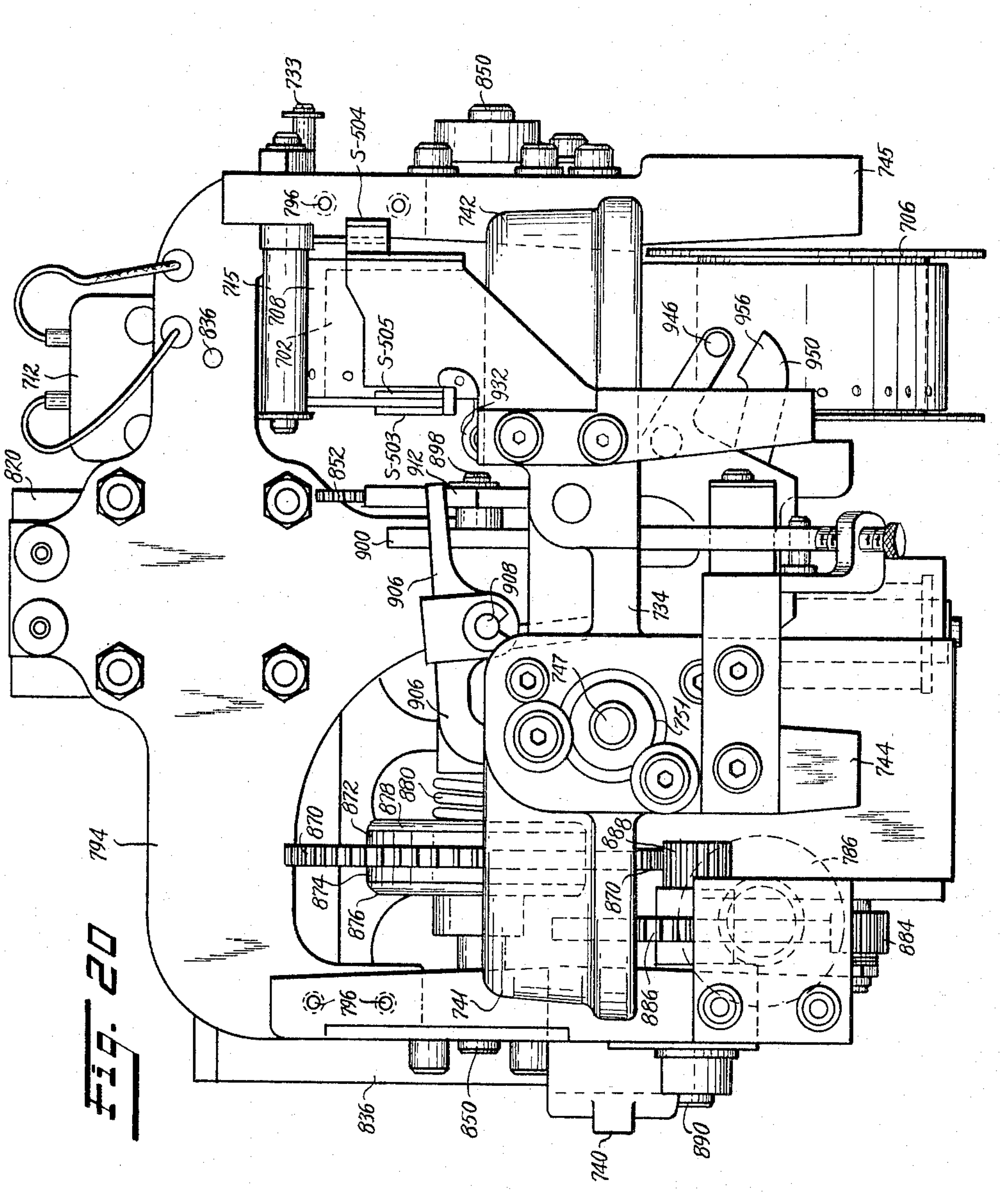
Figure 21:
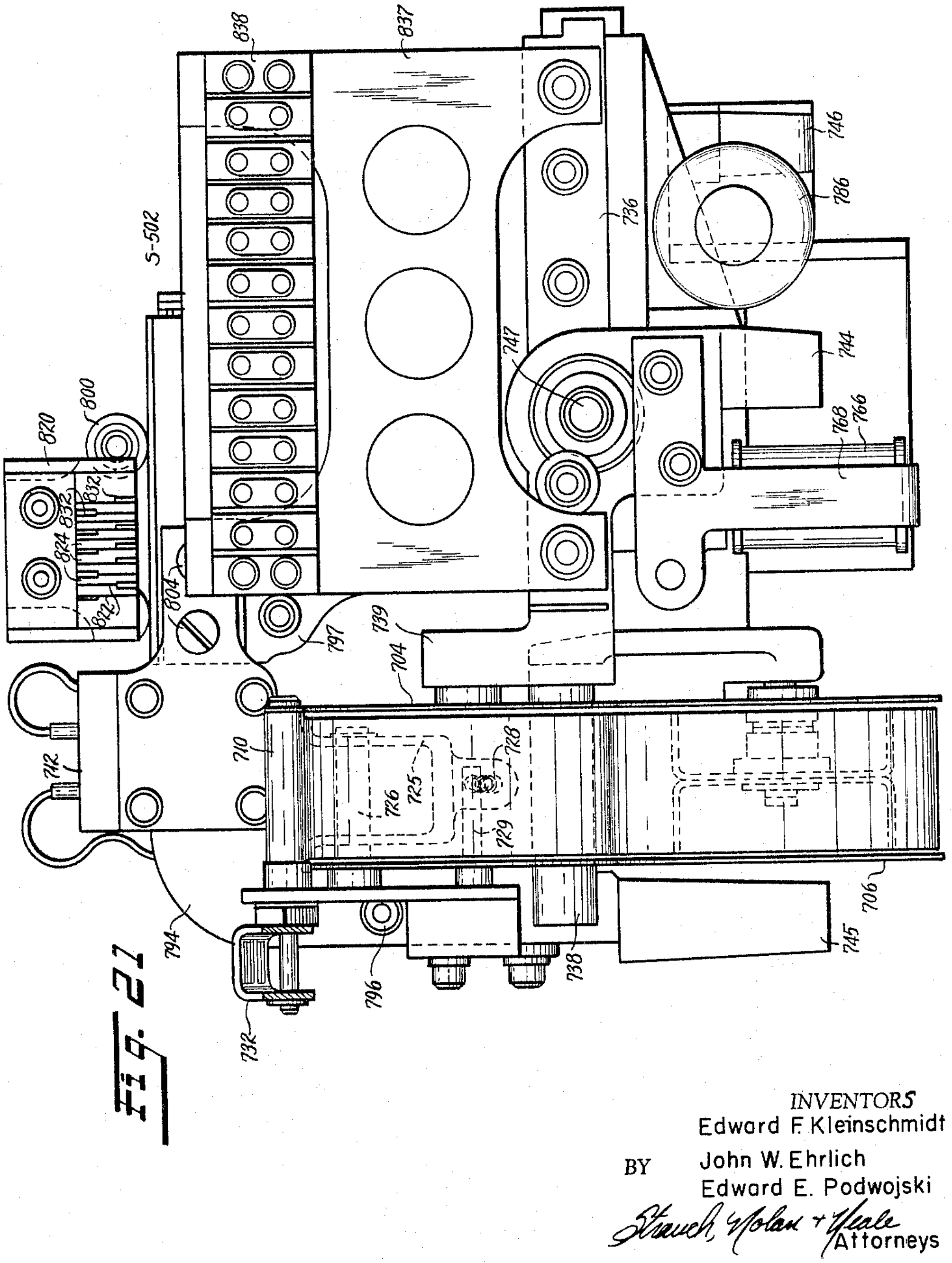

FIGURES 7A, 7B and 7C and 7D when arranged as shown in FIGURE 7 form a schematic diagram of the system function relay circuit;

FIGURE 8 is a schematic wiring diagram of the second register and amplifier circuits;

FIGURE 9 is a schematic diagram of the call system circuits;

FIGURE 10 is a schematic diagram of the receiver circuit;

FIGURE 11 is a schematic diagram of the control box circuits;

FIGURE 12 is a schematic diagram of the power supply;

FIGURE 13 is a schematic view of the tape drive system in the magnetic recorder unit;

FIGURE 14 is a view of an end section of the recording tape showing the control recesses;

FIGURE 15 is a view of the other end section of the recording tape showing the control notch;

FIGURE 16 illustrates diagrammatically the method by which the recording tape is a given set;

FIGURE 17 is a cross-sectional view of the tape after receiving the set taken along lines 17—17 of FIGURE 13;

FIGURE 18 is a top or plan view of an illustrative embodiment of the magnetic recorder unit constructed in accordance with the invention;

FIGURE 19 is a front view in elevation of the recorder unit of FIGURE 18;

FIGURE 20 is a right end view in elevation of the recorder unit shown in FIGURES 18 and 19;

FIGURE 21 is a left end view in elevation of the recording unit of FIGURES 18–20;

FIGURE 22 is a sectional view in elevation taken along section lines 22—22 of FIGURE 18;

FIGURE 23 is a plan view of the commutator assembly of the recorder unit;

FIGURE 24 is a perspective view of the tape drive mechanism with the various mechanical elements separated to more clearly show their functional relationships;

FIGURE 25 is an elevation view in section taken along lines 25—25 of FIGURE 18; and FIGURE 26 is a layout of the recording head drive mechanism.

*General*

Figure 1:
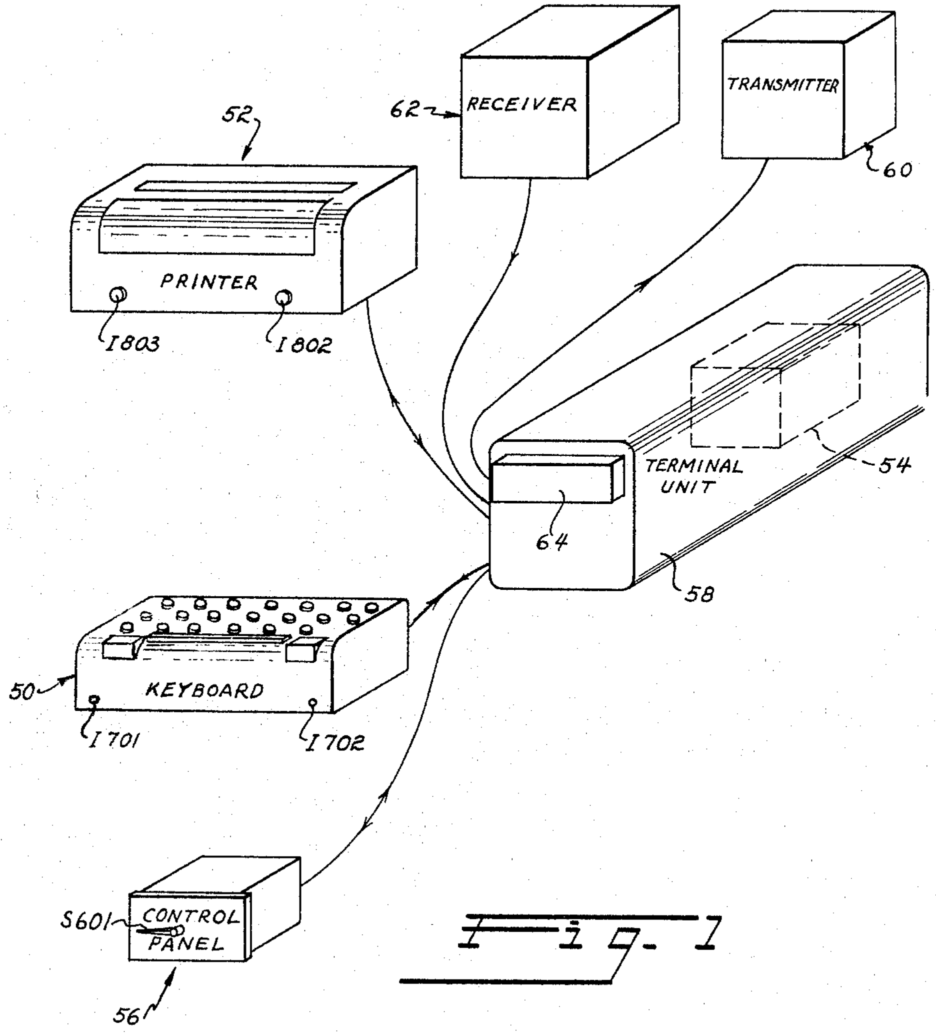
FIGURE 1 is a block diagram generally indicating the relationship of the several units which make up the communications equipment with which the present invention is utilized.

Referring to FIGURE 1, the over-all communication equipment with which the present invention is utilized physically constitutes five basic units: a keyboard 50 (FIGURE 1) the details of the mechanical structure of which are described in the aforenoted parent application Serial No. 547,265, and the electrical circuitry of which is shown in FIGURE 3, a page printer unit 52 the mechanical details of which are shown in the parent application and the electrical circuitry directly related to which is shown in FIGURE 5, a magnetic storage unit 54 utilizing a reversible magnetizable metal web, the mechanical details of which are shown in FIGURES 13 to 26 and the electrical circuitry of which is shown in FIGURE 4, a control box 56 the electrical circuitry of which is shown in FIGURE 11, and a terminal unit 58 housing the magnetic storage unit 54 and the circuitry shown in FIGURES 5 to 10 and 12.

In order that the relationship of the several components of the over-all system may be fully understood, this description will proceed with a general description of the functioning of the over-all system, a general description of the operation and relationship of the several units, a description of the circuitry and mode of operation and a detailed description of the storage unit.

The printing communication equipment was developed primarily for use in an airborne installation in cooperation with a radio transmitter 60 and a radio receiver 62. The equipment may be operated to control the radio transmitter 60 to transmit a time sequential message signal coded in the well known Baudot code either directly under control of the keyboard 50 or under control of the magnetic storage unit 54, a copy of the transmitted message being recorded in either event by the printer unit 52. The equipment may be operated to store a message in the magnetic storage unit 54 under control of the keyboard for later transmission from the storage unit 54 through the radio transmitter 60, a printed copy of the message being made by the printer both during storage and transmission from storage. A message stored in the storage unit 54 may be transmitted repeatedly so long as the message has not been erased from the storage unit. The equipment is further operable to receive messages identified by a unit call designation of the particular unit (that is, the particular aircraft in which the equipment is installed), and to receive messages identified by the group designation of the group of which the unit is a part (that is, the group of aircraft of which the aircraft in which the equipment is installed is operatively associated) or may be operated to print all messages transmitted on the frequency to which the receiver is tuned.

The printer unit 52 receives messages and records them on sprocket fed paper. It is associated with the signal circuits through the terminal unit 58. Incoming messages through receiver 62 are recorded as page copy and all messages transmitted from the keyboard 50 or magnetic recorder 54 are monitored by the printer unit 52.

Two lamps I–802 and I–803 on the cover of the printer indicate the source of the message being printed. The right-hand lamp I–802 glows when messages are coming from the radio receiver and the left-hand lamp I–803 glows when the printer is operating under all other conditions.

The keyboard unit 50 is provided with a standard arrangement of keys manually operable to cause the transmission by transmitter 60 of signals indicative of the twenty-six characters of the alphabet, plus signals indicative of line return, line feed, letters and space functions or to store such signals in the magnetic recorder 54 for future transmission. All messages originating at the keyboard 50 are monitored by the printer 52. A red lamp I–702 on the right end of the keyboard 50 glows to indicate the sixty-sixth character position of the printer 52, and a red lamp I–701 at the left end of the keyboard 50 glows to indicate, in the illustrated embodiment, that five lines of recording medium are available at the storage unit 54.

So long as the space bar of the keyboard 50 is depressed, closing contacts S–707 (FIGURE 3), the space designation of the code will be repeated.

The terminal unit 58 is an enclosure containing: the magnetic recorder 54 (FIGURE 4), a telegraph transmitter circuit (FIGURE 5), a telegraph receiver circuit (FIGURE 10), a call system circuit (FIGURE 9), an amplifier circuit (FIGURE 8), switching relay circuits (FIGURE 7) and a power supply circuit (FIGURE 12). The magnetic recorder (FIGURE 4) provides a means by which a message, or messages, originating from the keyboard unit 50 may be recorded and stored for future automatic transmission by the radio transmitter 60. The recorded message can be transmitted as many times as is necessary so long as it has not been erased.

The telgeraph transmitter (FIGURE 6) is made up of electronic equipment and circuits for generating coded sequential signals which are initiated by depressing a key on keyboard 50 or by operation of the magnetic recorder 54. The telegraph receiver (FIGURE 10) is made up of electronic equipment and circuits to convert coded sequential signals from the radio receiver 62 into simultaneous signals to be delivered to the printer 52 for its operation. The call system (FIGURE 9) is an arrangement of electronic equipment and circuits for turning the printer 52 on or off as indicated by a coded signal from the radio receiver 62. It also turns the recorder 54 off at the end of transmission. The recorder amplifier (FIGURE 9) strengthens the signals received from the magnetized tape of the recorder 54 which are subsequently sent on a simultaneous basis to the printer 52 and on a sequential basis to the radio transmitter 60. Power supply (FIGURE 12) contains electronic equipment to convert the available power source of 115 v., 400 cycle alternating current to the various A.C. and D.C. levels necessary for the operation of all the other equipment. A connection to a 26.5 v. battery current is also a part of this sub-unit.

A call patch box 64 is attached to the front of the terminal unit 58. It is an arrangement of diode matrix pots and circuits which define the unit call and broadcast call signals for the printer 52. The diode matrix pots have plug-in connectors to facilitate call system designation changes.

The control panel 56 (FIGURE 11) is manually operated to control the various functions of the equipment. A rotary selector switch S–601 determines the type of operation. This switch S–601 has five positions: TRANS KBD (radio transmission under keyboard control), TRANS STORE (radio transmission under control of the storage unit), RCVE (printing a received radio message), REWIND (rewind of the tape of the storage unit to its start position), and STORE (storage of a message under keyboard control). A CALL toggle switch has two positions: IN (in which only messages having proper call designations are monitored) and OUT (in which all messages are monitored). A POWER switch controls the electric current for the whole set. A lamp I–601 glows while power is on and another lamp I–602 glows after the rewind of the magnetic tape.

The terminal unit 58 of this equipment supplies to the transmitter 60 and receives from the receiver 62, electrical signals in a code form commonly known as "Baudot."

The signals used to designate the code for a character or function are of two types: "spacing" and "marking." Spacing signals are timed interruptions of a line current and marking signals are timed pulses of the current. By combining these two electrical conditions in groups of five in all possible ways, 32 different arrangements are possible, 26 of these permutated groups are used as code designations for the alphabet and the remaining 6 are used as code designations for printer functions.

With each one of the groups of five signals is included a "spacing" signal at the start and a "marking" signal at the finish. The addition of these two signals makes it possible to control the starting and stopping of the receiving equipment. The starting signal and the five intelligence signals are of equal length while the stop signal is 1.5 times as long. This longer stop pulse aids in synchronization of the transmitting and receiving equipment.

The basic principle of the operation of this teletypewriter equipment is one of the converting the coded positions of 5 mechanical elements into simultaneous current or no current conditions on 5 wire lines. These conditions in turn are distributed on a timed sequential basis for transmission over a single line. At the receiving end the reverse of this takes place and the single wire sequential group is converted to a five wire simultaneous group. In this case the coded electrical conditions of the five wires act to set a mechanical element in one of 32 positions which is indicated by that code group.

*General operating procedure*

To transmit from the keyboard to the radio terminal (messages originating at the keyboard are supplied to the radio transmitter in the form of sequential signals and at the same time are monitored by the printer unit), three steps are taken in addition to turning on the transmitter: (1) Shift POWER toggle S–603 (FIGURE 11) to ON, (2) turn selector switch S–601 (FIGURE 11) to TRANS KBD, and (3) manipulate keyboard 50 (FIGURE 3).

To store a message for future transmission (messages orginating from the keyboard are printed and also stored in the magnetic tape recorder for transmission at a later time), four steps are taken: (1) Shift POWER toggle S–603 (FIGURE 11) to ON, (2) turn selector switch S–601 to REWIND until lamp I–602 glows (the tape recorder is caused to rewind all of the tape on the take-up spool, thus bringing the beginning of the tape to the recording head, the glowing of lamp I–602 indicates that this has been completed) (3) turn selector switch S–601 to STORE, and (4) manipulate keyboard 50 (FIGURE 3).

To transmit a stored message to the radio terminal (messages previously stored in the magnetic recorder are supplied to the radio transmitter and monitored by the printer, at the end of these messages the equipment is automatically transferred from the TRANS STORE to RCVE condition), three steps are taken in addition to turning on the transmitter: (1) Shift POWER toggle S–603 to ON, (2) turn selector switch S–601 to REWIND and wait for lamp I–602 to glow, (3) turn selector switch S–601 to TRANS STORE.

To print only incoming messages preceded by the designated unit or group call signals (this is the normal stand-by condition in which sequential signals from the radio receiver cause the printer to type a page copy of only those messages which are preceded by correct unit or group call signals), three steps are taken: (1) Switch POWER toggle S–603 to ON, (2) turn selector switch S–601 to RCVE, and (3) Switch CALL toggle S–602 to IN.

To Monitor Home copy or to print incoming messages preceded by correct call signals (this is the condition where messages sent to the magnetic recorder for storage, and monitored by the printer, may be interrupted by incoming messages preceded by correct call signals; the keyboard will be locked until an End-of-Message signal is received, at which time the keyboard will be unlocked and local monitoring resumed), three steps are taken: (1) Switch POWER toggle S–603 to ON, (2) turn selector switch S–601 to STORE, (3) Switch CALL toggle S–602 to IN. If the incoming message fails to supply an End-of-Message signal the keyboard will remain locked and the set will continue to be in RECEIVE condition. To break the call system the operator must: (1) Turn the selector switch S–601 to RCVE, (2) switch the CALL toggle S–602 to OUT. The selector switch S–601 may then be turned back to STORE and the CALL toggle S–602 switched to IN.

To receive all messages (this is the condition in which the printer types all messages which are picked up by the radio receiver), the operator must: (1) Shift POWER toggle S–603 to ON, (2) turn selector switch S–601 to RCVE, (3) Shift CALL S–602 toggle to OUT. This conditon may also be operated in STORE or while monitoring line copy as in the preceding paragraph.

Before proceeding with the explanation of the circuitry, a brief explanation of the symbolism used in the circuit drawings is in order. In reference to relays, all relays are designated with the letter K followed by an identification numeral. Thus, K100 indicates relay 100 or a connection to the coil of relay 100. A letter suffix to a relay designation, such as K100A, indicates a connection to the "A" groups of contacts of relay 100. The letter prefixes C, O, A, such as CK100A, OK100A, or AK100A, designate respectively the normally closed, the normally open and the armature contacts of the A group of contacts of relay 100, or connections to those contacts. The leters R, C, E, V, CR, T, B, S, L, and PS followed by numerals represent conventional resistors, capacitors, solenoids, electron valves—vacuum and thyratrons, crystal rectifiers or diodes, transformers and magnetic core storage units, motors, switches, inductances and power supply terminals respectively or connections to such elements. The letters J and P followed by numerals designate sockets and plug connectors and letter or numeral prefixes for such designations indicate the pin connections of such sockets and plugs or connections thereto.

*Storage unit—Coordinated operation*

The storage unit is a magnetic tape recorder and reproducer designed to accommodate storage and read out of data indicative signals in the form of the Baudot code. The tape in the present form of the invention is a steel tape of sufficient width to provide at least five intelligence recording positions cross the width of the tape. In each recording cycle of operation, the recording head PU–501 (FIGURE 4) is caused to reciprocate across the width of the tape while the tape remains stationary, the movement of the recording head PU–501 being synchronized with the movement of the wiper of a commutator S-501 across five commutator contacts or segments which correspond to the five units of the five unit Baudot code. In between each recording movement of the recording head, the tape is advanced longitudinally one recording space by a sprocket drive wheel engaging a series of perforations extending longitudinally along one edge of the steel recording tape. This sprocket is driven by the motor B–501 through a friction driven escapement mechanism. The structural details will be completely described hereinafter.

As has been previously described herein, when it is desired to store a message in the storage unit for future transmission, the power toggle S–603 (FIGURE 11) is turned to its "on" position, the selector switch S–601 is turned to the rewind position until the lamp I–602 glows, the selector switch S–601 is then turned to its store position and the unit is ready for keyboard manipulation. Shifting of the selector switch S–601 (FIGURE 11) to its rewind position applies ground through section 1 of S–601 through pin HH of J–601 and P–601 through pin M of P–2 and J–2 and through pin 14 of P–501 and J–501 to one side of rewind relay K–501 (FIGURE 4). The opposite terminal of rewind relay K–501 is connected through pin 15 of J–501 and P–501 to a 26.5 volts source in the power supply (FIGURE 12). The energization of rewind relay K–501 reverses the connections between tape drive motor B–501 and the three phase power supply to reverse the direction of drive of motor B–501 to advance the tape in its initial starting position. When the tape reaches its starting position, the reset sensing switch S–505 closes to apply ground through pin 21 of J–501 and P–501, through pin W of J–2 and P–2, through pin K of P–601 and J–601 to the connection to one side of lamp I–602, the opposite side of which is connected through pin *m* of J–601 and P–601 to a 26.5 volts power supply source. Illumination of I–602 advises the operator that the storage tape is rewound. The tape drive sprocket is automatically disengaged from its drive mechanically when the tape is restored to its starting position.

The selector switch S–601 (FIGURE 11) is now set to its "store" position to de-energize relay K–501 (FIGURE 4) and restore the normal direction of drive of tape drive motor B–501 and to establish the necessary circuitry to permit storage of information in the storage unit under control of the keyboard. When the selector switch S–601 (FIGURE 11) is set to its "store" position, ground is applied through stage 2 of the selector switch S–601, through pin DD of J–601 and P–601, through pin X of P–1 and J–1 (FIGURE 7A) to a terminal of the relay coil K–714 (FIGURE 7B) to energize relay K–714, the opposite terminal being connected to the 26.5 volts power supply line.

To provide an "erase" operation ground is also supplied by this connection to K–714 through pin 33 of P–901 and J–901 (FIGURE 8) to energize relay K–901.. The energization of K–901 applies a 6.3 volt A.C. current from terminal 2 of the power supply (FIGURE 12) through pin 34 of P–901 and J–901 (FIGURE 8), through the normally open contacts K–901A, through pin 42 of J–901 and P–901, through pin 6 of P–501 and J–501 to the erase coil L–501 (FIGURE 4), the opposite side of which is grounded to terminal 1 of the power supply (FIGURE 12) through pin 7 of J–501 and P–501 (FIGURE 4). The erase coil L–501 is so located in the storage unit that the steel recording tape must pass through the erase head L–501 before reaching the recording head FU–501 when the tape is being advanced in its normal direction.

For recording, energization of K–901 (FIGURE 8) also connects the wiper of commutator S–501 (FIGURE 4) through pin 13 of J–501 and P–501 through pin 44 of P–901 and J–901 (FIGURE 8) through the normally closed contact K–902A, through resistor R–908, through the normally open contacts K–901B, through pin 40 of J–901 and P–901, through pin 11 of P–501 and J–501 (FIGURE 4) to one side of the recording head PU–501. The opposite side of recording head PU–501 is connected through pin 12 of J–501 of and P–501, through pin 41 of P–901 and J–901 (FIGURE 8) to ground. By this connection any voltage appearing upon the segments 1 through 5 of commutator S–501 will induce current flow in the recording head PU–501 (FIGURE 4) to record upon the tape as the wiper of commutator S–501 is moved across those segments.

The segments 1 through 5 of commutator S–501 are connected through pins 1 through 5 respectively of J–501 and P–501 to the normally opened contacts A, B, C, D and E of relay K–714, which is energized, as has been pointed out before, when the selector switch S–601 (FIGURE 11) is in its "store" position. The armature contacts A, B, C, D and E of relay K–714 are connected to the normally open B contacts of relays K–701, K–702, K–703, K–704 and K–705 respectively. It will be recalled that in keyboard operation, the energization of relays K–701 through K–705 is under control of the code bar actuated switch S–706 through S–702 (FIGURE 3) and that upon the closure of any of these switches the corresponding one of the relays K–701 through K–705 will be energized. The armature contacts B of relays K–701 through K–705 are connected in common to the armature contact K–714F, which when K–714 is energized during storage operation, is connected through contact OK–714F to the 26.5 volt D.C. line.

By this circuitry therefore the movement of a code bar in the keyboard to close one of the code bar actuated switches S–706 through S–702 is effective to apply a 26.5 volt signal to the corresponding one of the segments 1 through 5 of commutator S–501 (FIGURE 4) which, as the wiper of commutator S–501 is moved in synchronization with the recording head PU–501, is effective to induce current flow through the recording head PU–501 and recordation of a signal in a position transverse of the tape corresponding to the code bar moved.

The storage unit start magnet E–501 (FIGURE 4) is connected between terminal 5 of the power supply (FIGURE 12), source of 150 volts plus, through pin 9 of J–501 and P–501 and the anode of the recorder release magnet tube V–213 through pin 8 of J–501 and P–501 and pin 16 of P–201 and J–201 (FIGURE 9). The grid of this tube V–213 is pulsed, upon energization of K–706 by the universal bar contact S–701, through pin 9 of J–201 and P–201, AK217D, CK217D, AK706B, OK706B, Y12, and yP601, from the junction of R–602 and R–603, R–602 being connected to a plus 150 power supply by terminal in "store." This same signal forms a transfer pulse to the printer from AK706B, through CK217A, AK217A, 2J2 and 11P801.

During the storage operation, the A contacts of relays K–701 through K–705 are effective through the normally open contacts of relays K–808 and K–809 (FIGURE 7D) to apply ground alternatively to the pairs of pins 4 and 9, 5 and 10, 3 and 8, 2 and 7, and 6 and 1 of J–701 (FIGURE 5) to control the positioning of the typewheel carrying square shaft in the printer. K–808 and K–809 are energized during "store" by the application of ground through TJ1, BP601, AK601B, CK601B, and the store contact of section 3 of S–601. In this manner a printed record is made of the information stored in the storage unit.

When it is desired to transmit a stored message to the radio transmitter, the power toggle switch S–603 (FIGURE 11) is turned to "on," the selector switch S–601 is set to its "rewind" position until the lamp I–602 glows to rewind the steel recording tape to its start position as has been described hereinbefore, and the selector switch S–601 is turned to its "transmit store" position. With the selector switch S–601 (FIGURE 11) in its "transmit store" position, relay K–901 (FIGURE 8) remains deenergized, and relay K–902 one side of which is connected through pin 43 of J–901 and P–901 to the 26 volt line, is energized by grounding the opposite terminal thereof through pin 31 of J–901 and P–901 to one side of the coil of relay K–710 (FIGURE 7B) as a terminal, through pin W of J–1 and P–1 through pin *w* of P–601 and J–601 (FIGURE 11) through section 5A of selector switch S–601, through pin *w* of J–601 and P–601, through pin P of P–1 and J–1 (FIGURE 7A), through the normally closed relay contacts K–215B, through pin M of J–1 and P–1, through pin CC of P–601 and J–601 (FIGURE 11) and through stage 3 of selector switch S–601 to ground. Relay K–215 is connected in the plate circuit of transmit store end of message detector tube V–211 (FIGURE 9). This relay is energized upon transmission of the end of message signal after completion of transmission of a message from storage and is effective to restore the circuit to its "receive" condition to record incoming signals.

Figure 7A:
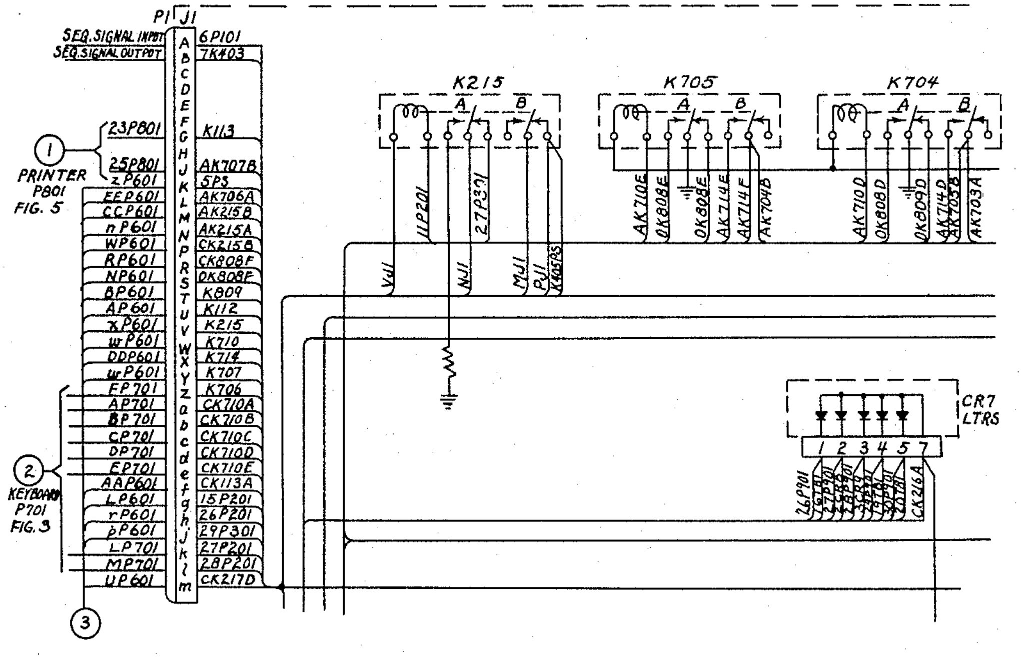
Figure 7:
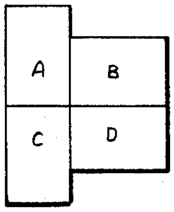
Figure 7B:
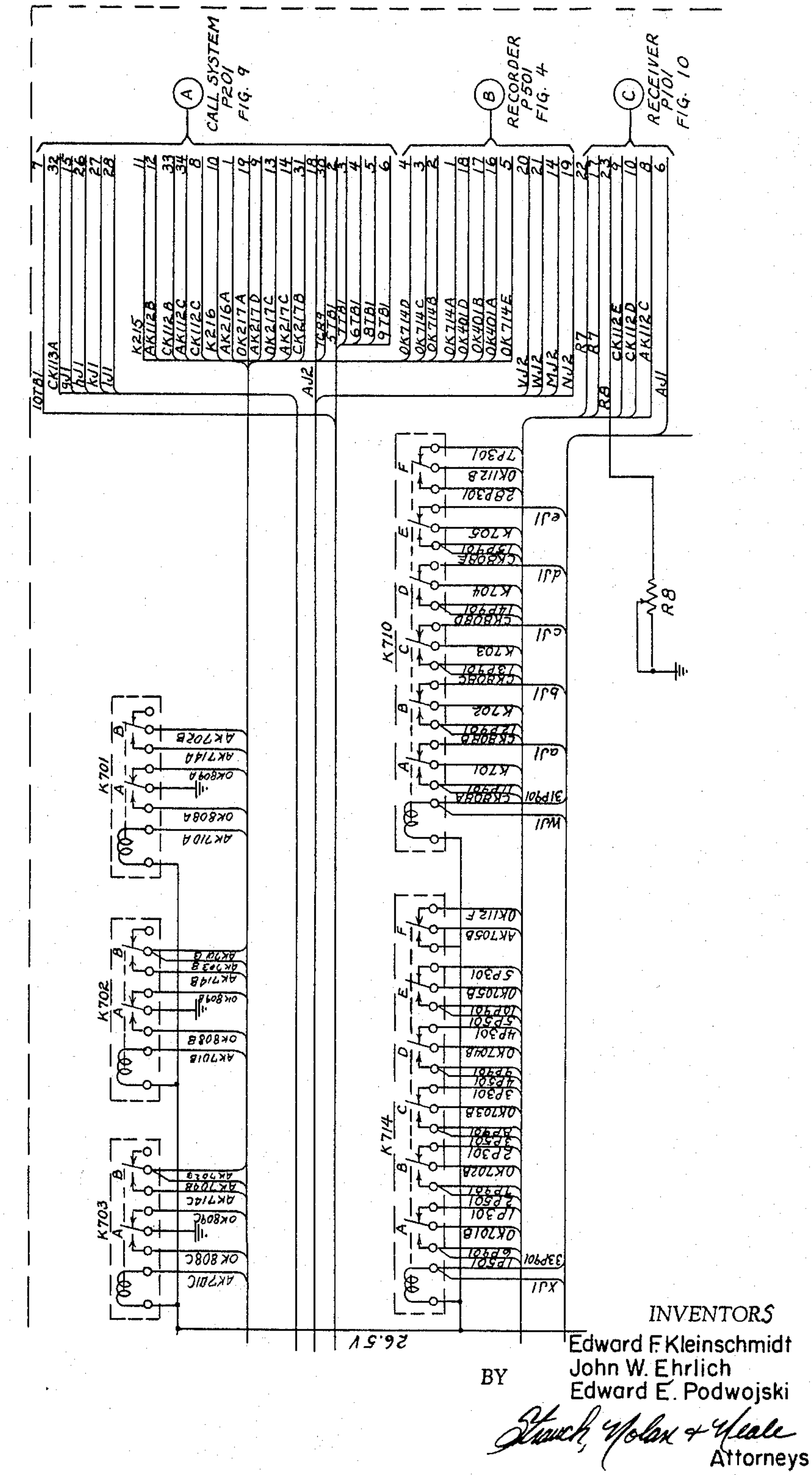
Figure 7C:
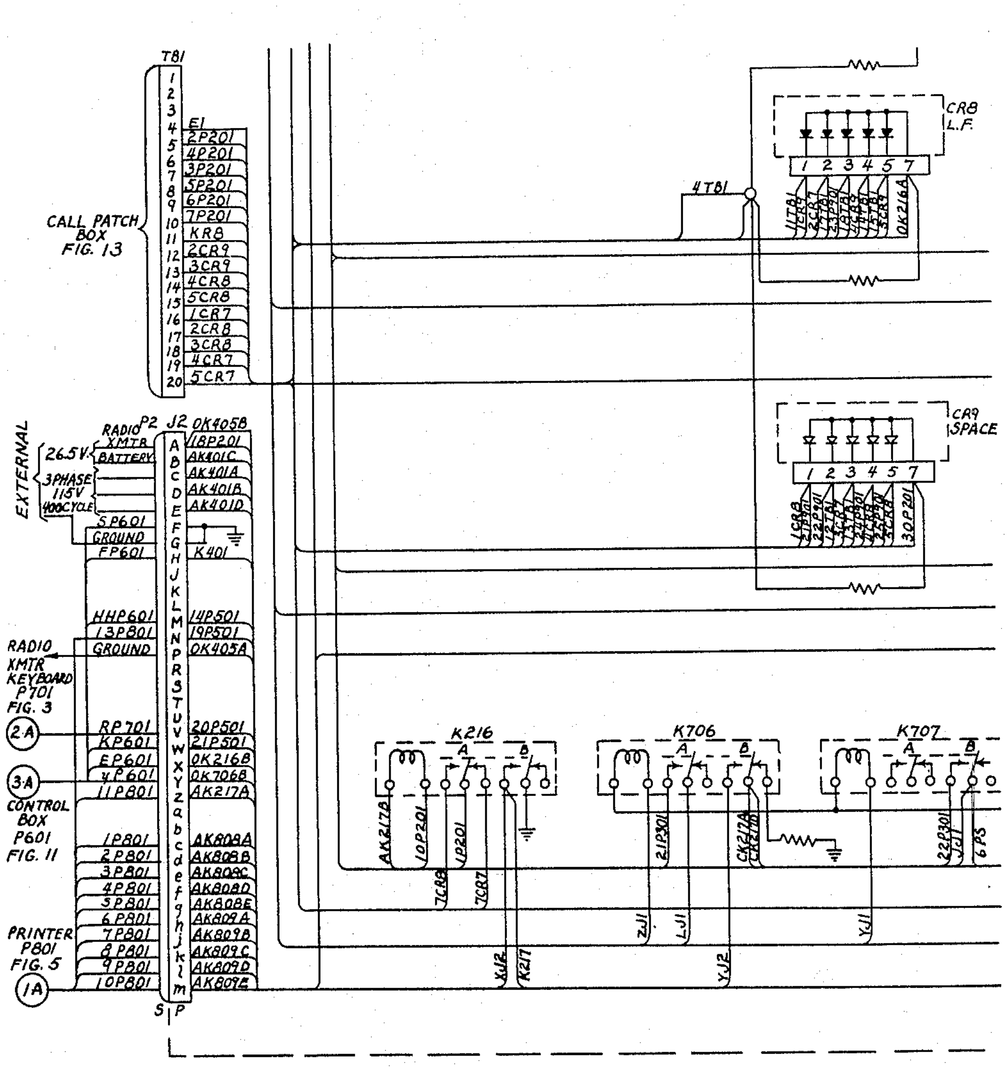
Figure 7D:
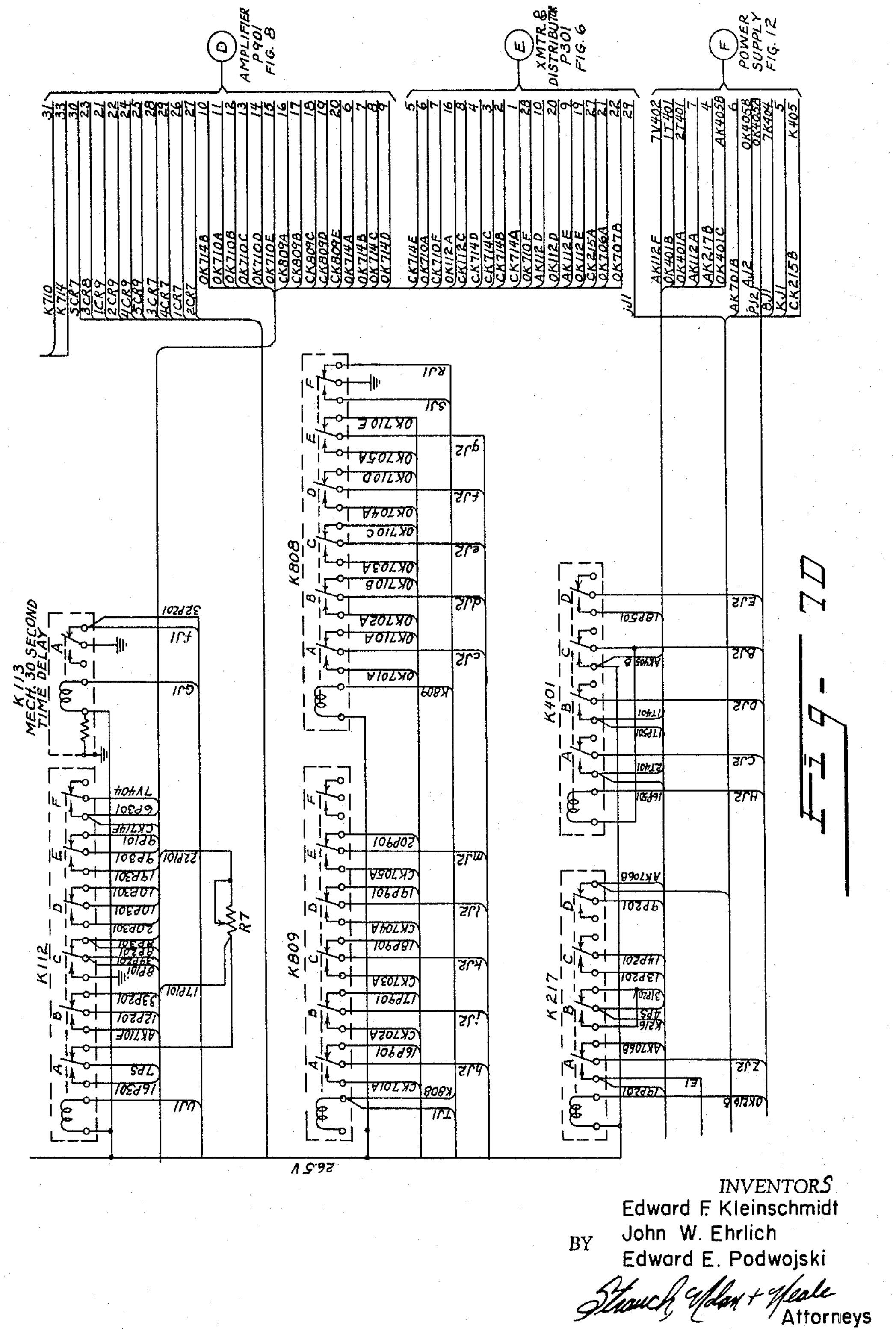
Figure 8:
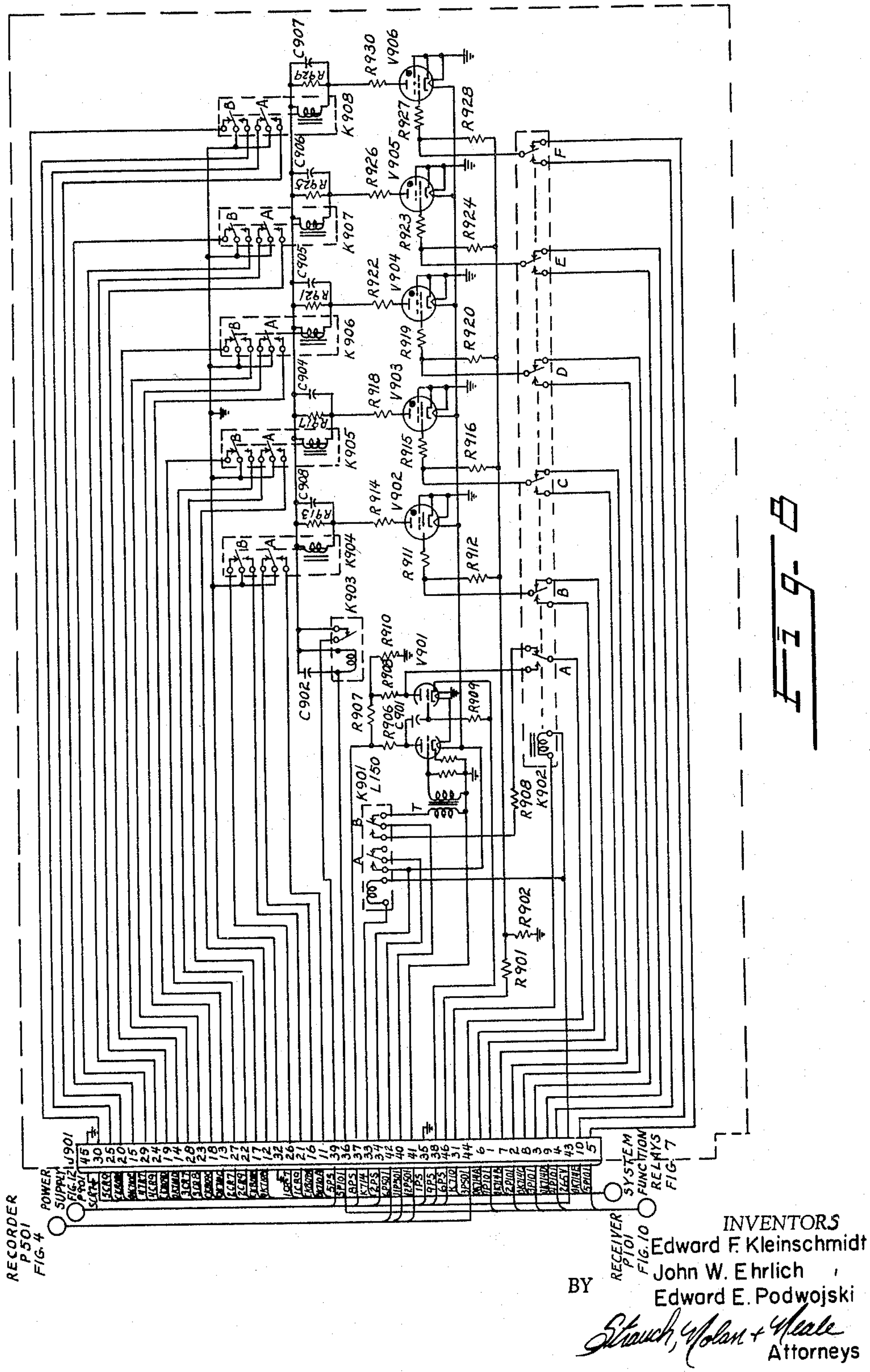
Figure 9:
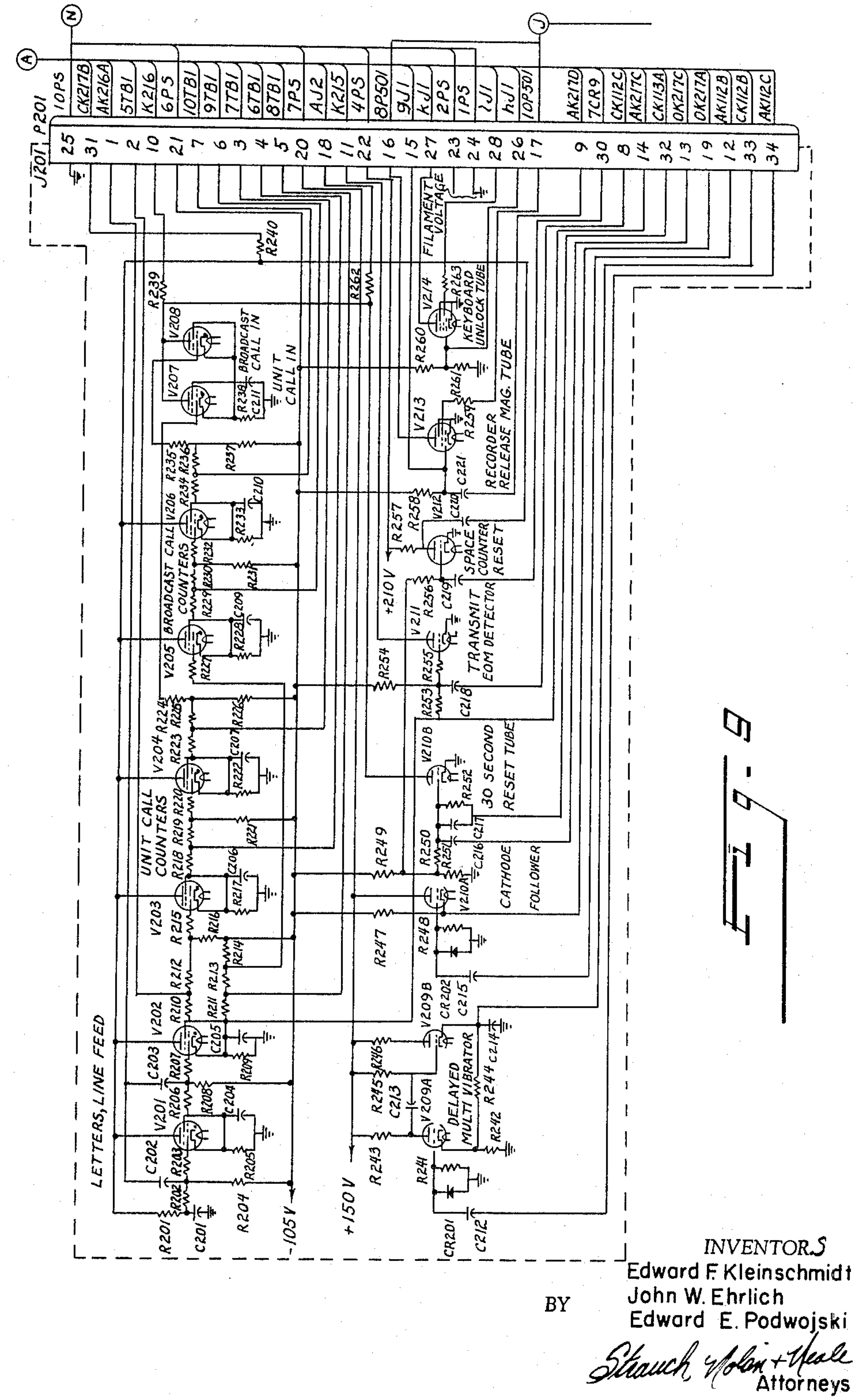
Figure 10:
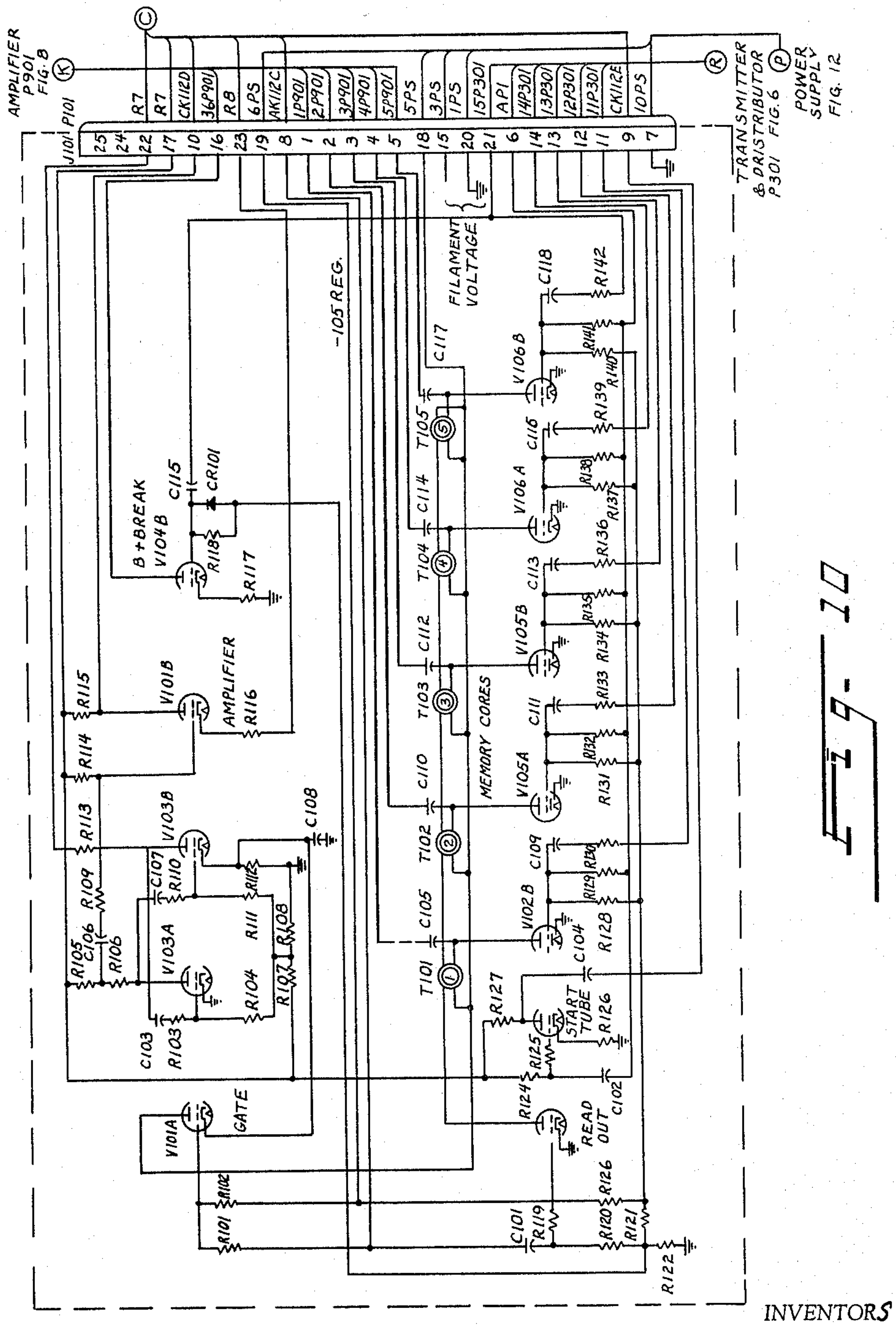
Figure 11:
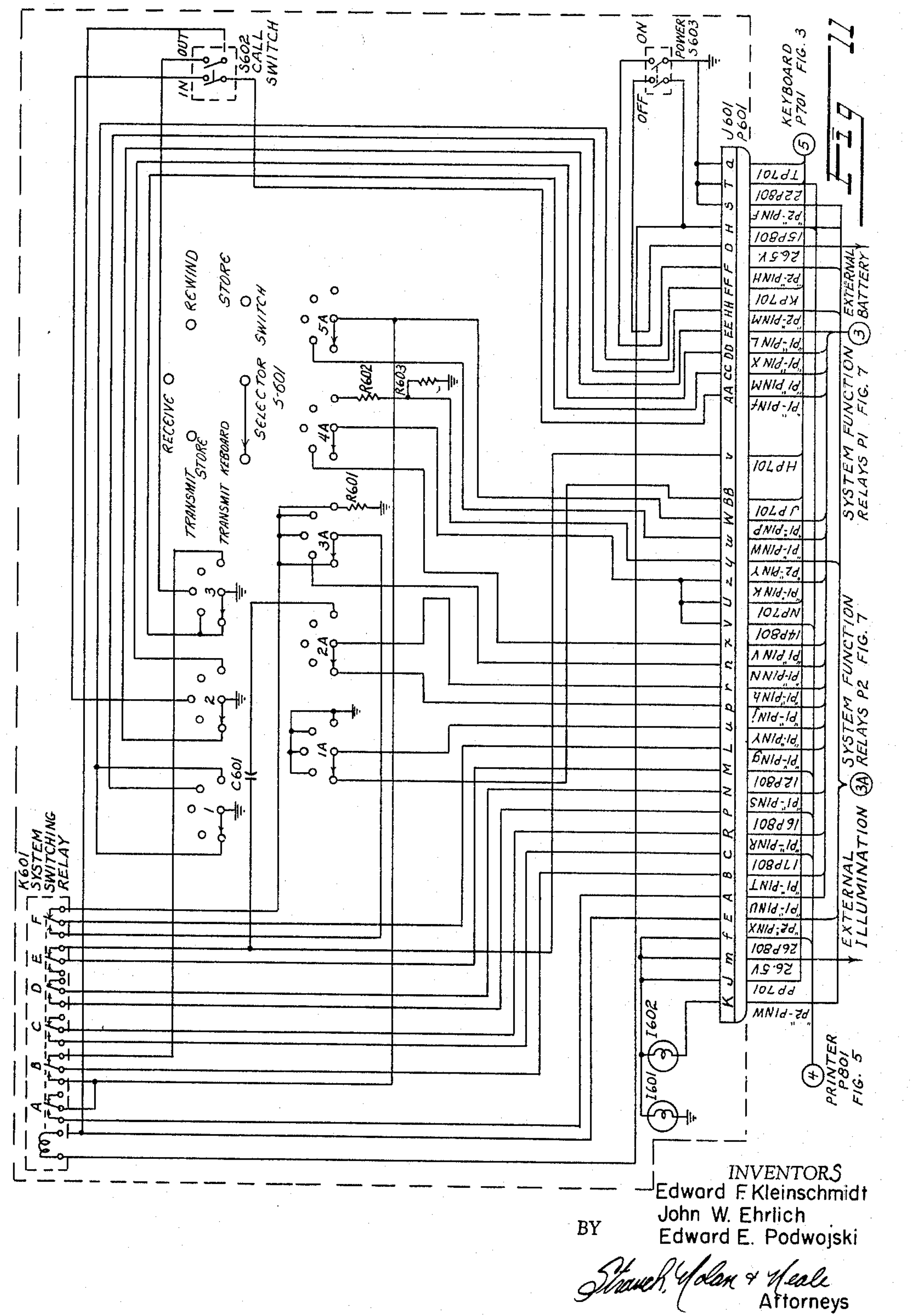
Figure 12:
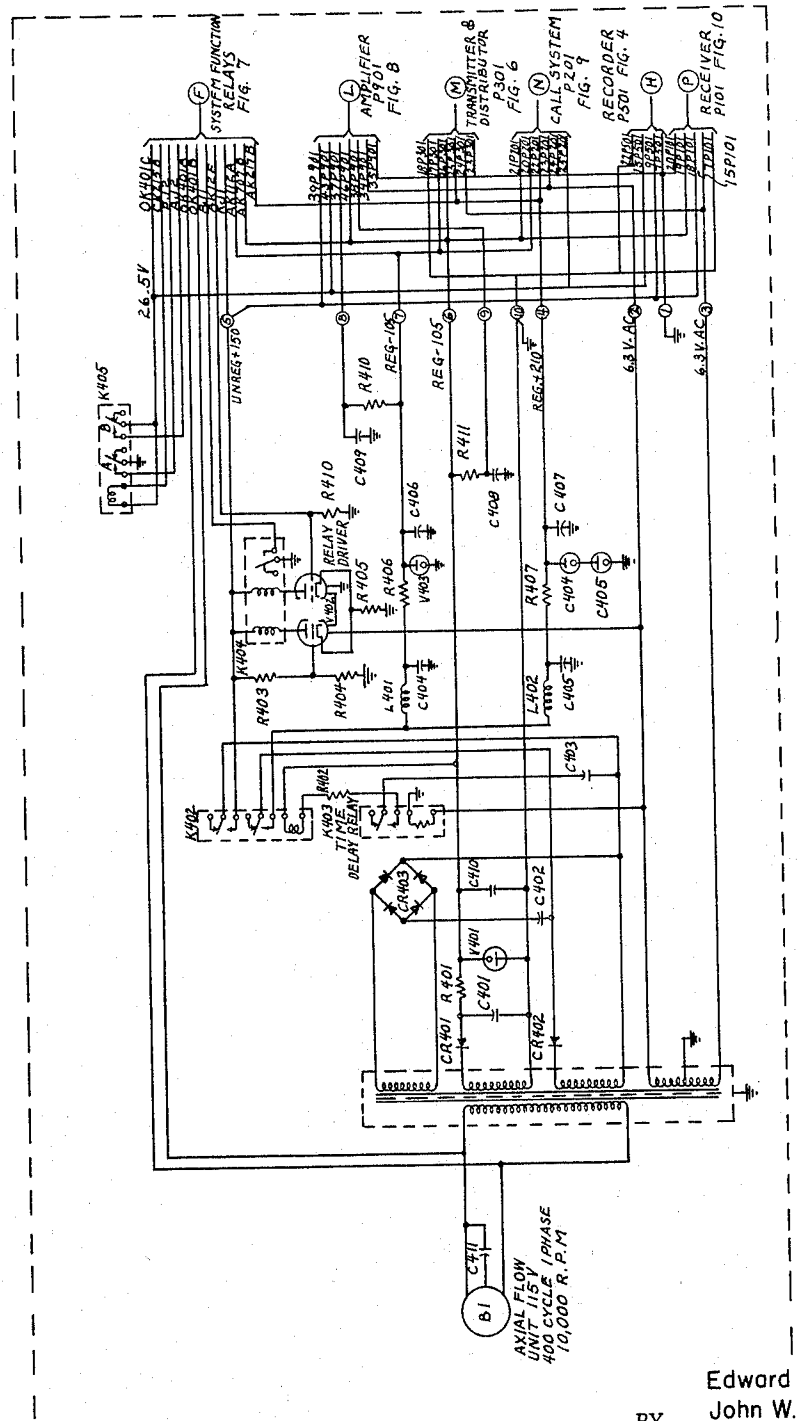

Referring again to FIGURE 8, with relay K–901 deenergized, the ungrounded side of recording head PU–501 (FIGURE 4) is connected through pin 11 of J–501 and P–501, through pin 40 of P–901 and J–901 (FIGURE 8) through the normally closed contacts K901B, to the ungrounded side of the primary winding of transformer T–901 which is connected in the grid input circuit of amplifier tube V–901A the output of which is connected to the grid of a second stage amplifier tube V–901B. With relay K–902 energized as has been previously described, the output of V–901B from its anode is connected through normally open contacts K–902A, through pin 44 of J–901 and P–901, through pin 13 of P–501 and J–501 (FIGURE 4) to the wiper of commutator S–501. As has been previously pointed out, the segments 1 through 5 of commutator S–501 are connected to the normally open contacts A through E of relay K–714 (FIGURE 7B). These normally open contacts A through E of relay K–714 are also connected to pins 6, 7, 8, 9 and 10 respectively of P–901 and J–901 (FIGURE 8) which are respectively connected to the normally open contacts B, C, D, E and F or relay K–902 which, when relay K–902 is energized as it is during "transmit store" operation, is effective to connect these terminals to the input grid circuits of thyratron tubes V–902, V–903, V–904, V–905 and V–906.

By this circuitry during transmit store operation, as the recording head and commutator move in synchronism across the tape, signals are induced in the recording head PU–501 (FIGURE 4) which are amplified by V–901 (FIGURE 8) and applied to the wiper of commutator S–501 (FIGURE 4). This signal is distributed over the five wires in synchronism with the movement of the recording head PU–501 by the commutator S–501. A recorded signal in the 1, 2, 3, 4, or 5 position across the recording tape will thus be effective through the circuitry to fire the corresponding one of thyratrons V–902, V–903, V–904, V–905 or V–906 respectively. The firing of any one of these five thyratrons is effective to energize the one of the relays K–904, K–905, K–906, K–907 and K–908 connected in its anode circuit. These relays will remain energized and the associated one of the tubes will remain conducting until released by energization of relay K–903 by the conduction of tube V–104B (FIGURE 10) in the plate circuit of which relay K–903 is connected through pin 36 of J–901 and P–901 and through pin 16 of P–101 and J–101 (FIGURE 10). The timing of the energization of K–903 to break the B plus line to thyratrons V–902 through V–906 as well as V–104B will be explained hereinafter.

The normally open contacts A of relays K–904 through K–908 are connected tthrough pins 11, 12, 13, 14 and 15 of J–901 and P–901 to the normally open contacts A, B, C, D and E of relay K–710 (FIGURE 7B).

It will be remembered that during "transmit store," relay K–710 is energized in parallel with relay K–902 as has been explained hereinbefore. With relay K–710 energized, the normally open contacts A, B, C, D and E of relay K–710 are connected respectively to the coils of relays K–701, K–702, K–703, K–704 and K–705. Thus the energization of any one of the relays K–904 through K–908 will produce energization of a corresponding one of the relays K–701 through K–705. As has been described hereinbefore in reference to "transmit keyboard" operation, the permutative energization of relays K–701 to K–705 controls the application of ground to terminals 1 through 10 of J–801 of the printer unit (FIGURE 5) through the normally open contacts of relays K–808 and K–809 (FIGURE 7D) to control the printer operation. In "transmit keyboard" and "transmit store," K–808 and K–809 are energized through TJ1, BP601, AK601B, OK601B, WP601, PP–1, CK215B, AK215B, MJ1, CCP601 and section 3 of S–601 to ground.

By this circuitry, therefore, the selective energization of relays K–904 through K–908 (FIGURE 8) is effective to selectively apply ground to the terminals 1 through 10 of J–801 of the printer unit for controlled printing in the same manner as described hereinbefore in reference to the control of the printer and the control of the keyboard. Thus during "transmit store" operation the printer unit is operated to produce a printed record of signals read from the storage unit and transmitted, as will now be explained.

Pulses from the number 3, 4, 5, 6 and 7 distributor tubes V–302 through V–306 (FIGURE 6) are applied through diodes CR–301 through CR–305 (FIGURE 6) through terminals 1 through 5 of J–301 and P–301 to the normally closed contacts A through E of relay K–714 (FIGURE 7B) to the normally open B contacts of relays K–701 through K–705 respectively. The armature B contacts of relays K–701 through K–705 are connected through a common connection to the armature contact K–714F and the normally closed contact K–714F to the normally opened contact K–112F. The normally opened contact K–112F is also connected through pin 6 of P–301 (FIGURE 6) and through diodes CR–306 and CR–307 to the output of the seventh and eighth distributor tubes V–307 and V–308. During "transmit store" operation, relay K–112 is energized through pin U of J–1 and P–1 (FIGURE 7A, through pin A of P–601 and J–601, through the normally open A contacts of relay K–601 (FIGURE 11), through pin W of J–601 and P–601 which is grounded through the B contacts of relay 215 when the selector switch S–601 is in its transmit keyboard or transmit store positions as has been explained hereinbefore.

It is apparent from the foregoing explanation that, in timed sequence with the cyclical operation of the ring counter of FIGURE 5, a time sequential signal including a pulse from those of the distributor tubes V–302 through V–306 associated with an energized one of the relays K–701 through K–705 and an impulse from the seventh and eighth distributor tubes V–307 and V–308 will appear at the normally open contact K–112F. With relay K–112 energized as has been explained hereinbefore, this train of signals is applied to pin 7 of relay driver tube V–402 (FIGURE 12) to control the operation of the signal relay K–404 to apply ground to pin B of J–1 and P–1 which is the sequential signal output connection to the radio transmitter.

By this circuitry, during transmit store operation, the five unit signal recorded in the storage unit (FIGURE 4) is sensed and converted into simultaneous signals represented by the selective energization of relays K–904 through K–908 (FIGURE 8) which is utilized to effect control, through relays K–701 to K–705, of the printer in accordance with the significance of the signal and to produce a time sequential signal under control of the ring counter (FIGURE 6) for transmission to the transmitter indicative of the same data as that of the signal sensed in the storage unit.

The sequential signal to the transmitter during transmit keyboard operation is generated and produced by the same circuits as has just been described for transmit store operation.

*Storage unit—Structural details*

The magnetic recorder unit for the teletypewriter provides means by which the operator can, if desired, record and store a message and at some future time automatically transmit the recorded message. It accordingly includes a data storage device and in view of the space limitations and environmental conditions under which the recorder unit is to operate, the storage medium found to be most suitable was a magnetic record. The magnetic record provides satisfactory storage for an indefinite period of the teletypewriter signals and allows re-use of the recording medium.

Steel tape was chosen as a magnetic recording medium because of its durability under heavy record and playback head pressures, and by subjecting the steel tape to a set, it has been found that an auxiliary drive on the tape feed and take-up reels may be eliminated, thereby reducing the over-all weight and complexity of the recorder unit.

A further feature of the recorder unit resides in the novel recording system wherein the tape makes step movements of approximately .075 inch while the recording head rests on one edge of the tape, and at selected intervals after the tape has come to rest the recording head moves across the tape and returns in a period of a few milliseconds. The information for each letter or character to be stored is recorded serially across the tape in separate channels.

Because only a single head is used to read or record signals in all the channels on the tape, it is possible to record ten separate channels across a tape of only seven-eighths inch width even with space deducted for tape feed sprocket holes and with ample allowance provided for marginal spacing away from the edge of the tape. While the recording equipment as described below is capable of recording in ten separate channels across the tape, only five channels corresponding to the separate pulse time periods in the Baudot code are used in the described teletypewriter system and the commutator on the recorder unit is arranged accordingly.

The novel recorder unit of the present invention is adapted for operation in a remote position with rewind, playback and record functions all being controlled without local supervision. The unit is designed to provide trouble free operation with only periodic maintenance checks required. Mechanical as well as electrical interlocks are provided for assuring that the recording tape is not removed completely from either tape spool during operation or rewind of the recorder.

The recorder unit has two electric motors which run continuously when the recorder unit is operating and only one of the motors needs to be reversible for rewinding the tape. During the playback operation the electrical circuitry for the recorder requires only one voltage amplifier for the output of the recording head. The amplifier output is commutated to the five thyratron controlled relays in the teletypewriter system which store the information for use by the printer and electronic transmitter as discussed above in connection with FIGURE 8.

During a recording operation the erase head on the recorder unit is energized by a 400 c.p.s. current available from the main power source in the aircraft. The signal to be recorded is supplied to a commutator in the recorder whose contact arm moves concomitantly with the recording head to assure proper correlation between the various signals in the Baudot code and the corresponding signal channels in the recording tape.

With a tape having a 270 inch active recording length, the magnetic recorder will store approximately 3600 characters which is equivalent to an average 600 words. The information to be recorded can be supplied to the recorder at any convenient speed and may be entered through the keyboard a letter at a time over an indefinite period. After the message is recorded the tape is rewound and is played back at a uniform rate for transmission to receiving stations. Since the playback is entirely automatic and without manual intervention, the message can be transmitted at any desired speed and the rate of transmission is limited only by the speed limitations of the transmitting and receiving equipment. The present equipment is intended to operate in a system with existing teletypewriter equipment and is adjusted to transmit at the rate of 60 words or 360 characters per minute thereby requiring approximately ten minutes to transmit a message recorded on the entire active length of the tape. The rewind time for the entire tape takes less than ten seconds.

As previously noted, the storage sub-unit is a magnetic tape recorder and reproducer designed to accommodate the Baudot code. The code is magnetically recorded across the tape so that the five intelligence signals of the Baudot code are laterally adjacent to one another. The tape is advanced with intermittent motion under the head between the recording or playback operation for each successive letter or character. The recording or reading operation of the coded signals in the five channels across the tape is effected by means of a single recording head. The same mechanical movements are used for both reading and recording. The tape is stationary during the transducing operation and the head is moved laterally across the tape at a sufficiently rapid rate in one direction so that a signal of sufficient amplitude is obtained for use as an input signal to an amplifier during the reading operation.

Referring to FIGURE 13, the basic drive mechanism for advancing the magnetic tape comprises a tape feed sprocket wheel 702 mounted in the path of the tape between feed reel 704 and take-up reel 706. The magnetic tape 708 advances from feed spool 704, under roller 710, between recording head 712 and guide roller 714, under guide roller 715 and around approximately 120° of tape feed sprocket wheel 702 to take-up spool 706. The tape motion is controlled entirely by movement of the sprocket wheel 702 and tape spools 704 and 706 are both mounted for free rotational movement with no auxiliary driving means being provided.

Recording tape 708, also separately shown in FIGURES 14 and 15, is made of polished spring steel. The tape contains a series of sprocket tooth holes 716 along one edge for receiving the teeth on sprocket wheel 702 and there are three notched areas where the edge of the tape has been removed. Notch 718 is near the end of the tape and is utilized as a control means for preventing the tape from becoming completely removed from feed reel 704 during the recording or playback operation. Notch 719 is on the opposite side of the tape and is used to control the position of switch S–504 (see FIGURES 18 and 24) for indicating to the operator that only five additional lines of printed material can be recorded on the printer before reaching the end of the tape.

Referring to FIGURE 15, notch 720 is provided near the beginning of the tape with two special edge formations 721 and 722. Edge 721 is for use as a mechanical stop for preventing the tape from being unwound from take-up reel 706 during the rewinding operation and the other edge 722 is to control the position where recording is started on the tape, as will be more fully described hereinafter in connection with operation of the recorder unit. Additional switch contacts S–503 and S–505 (see FIGURES 18 and 24) are controlled by notches or recesses 720 and 718 for indicating when the tape is rewound and to block the keyboard when the end of the tape has been reached respectively.

The main body of the recording tape 708 which fits between broken ends of FIGURE 14 and FIGURE 15 comprises the useful area for recording information and may be any desired length within the spool capacity of the machine. Spools 704 and 706 are not provided with auxiliary driving means, the steel tape being preformed by a special operation before being punched to assure satisfactory winding on the reels.

The special preforming operation involves pulling tape 708 when under tension around a cylindrical roller 723 as illustrated in FIGURE 16. The diameter of roller 723 is smaller than the drum diameter of spools 704 and 706 so that once the spring steel tape has been given this set, each elemental length of tape 708 has a tendency to coil about a diameter approximately the size of the diameter of roller 723.

With the drum diameter of tape spools 704 and 706 approximately twenty-five percent larger than the outside diameter of cylinder 723 in FIGURE 16, the tape is given a set which causes it to automatically wind itself on the take-up spool as tape drive sprocket wheel 702 advances in either direction. The auxiliary rollers 714 and 724 of FIGURE 13 are provided to hold the tape in position on tape drive sprocket wheel 702 as it is important that the sprocket wheel does not slip with respect to the tape. The unit is arranged so that the tape does not become removed from either spool. The set in the tape supplies a continuous force tending to cause each reel to attempt to wind the tape on itself and therefore provides a tension force on the tape at all times.

Guide roller 714 which is immediately beneath recording head 712 forces tape 708 in rubbing contact with the lower surfaces of recording head 712. The pressure required is to cause adequate inductance of magnetism into the tape and read-out voltage from the tape. Since the cross section of tape 708 becomes arched as shown in FIGURE 17 after being given the set discussed in connection with FIGURE 16, the pressure applied causes an incidental flattening of the tape. Roller 714 is accordingly mounted on lever 725 which is supported for pivotal movement about fixed pin 726 and biased by means of spring 727 to supply sufficient force against recording head 712 to flatten the tape under the recording head. The force of roller 714 against recording head 712 is made adjustable by screw 728 which is attached to the frame. Satisfactory operation has been obtained when the recorder is subjected to the forces caused by vibration and acceleration of an aircraft with a tape having a thickness of .0045 inch and a width of ⅞ of an inch with a force of approximately ten ounces exerted by roller 714 against head 712.

The top surface of tape 708 is polished and extremely smooth, and because tape 708 moves only intermittently and is thereby stationary during the time recording head 712 advances across the tape for a recording or reading operation, there is very little wear on the recording area on the tape and the wear on recorder head 12 is not excessive. During the rewind operation when high tape speed is used, the recording head is at the edge of the tape and away from the area used for recording information.

The tape passes through a conventional erase head 730 which is pivotally supported to allow for the change in tape path between spool 704 and roller 710 with different amounts of tape remaining on the spool. Erase head 730 is mounted on the free end of arm 732 which is preferably pivotally mounted near the lower edge of roller 710. However, from a practical standpoint, it is more convenient to mount arm 732 to pivot along the axis of roller 710 and this compromise has been found to provide satisfactory operation.

Rollers 710 and 715 are approximately evenly spaced on opposite sides of recording head 712, and in cooperation with spring biased roller 714 and the pole face of recording head 712, cause the tape to pass along a uniform path under the recording head regardless of the amount of tape remaining on feed spool 704. Roller 715 is close to the periphery of tape feed sprocket wheel 702 to assure that the tape rides along the sprocket wheel without slippage. Roller 724 is similarly located for the same purpose at the opposite side of the sprocket wheel. Additional guides for holding the tape against the periphery of sprocket wheel 702 may be used if necessary to prevent slippage of the tape on the sprocket wheel.

Steel tape, given the set described in connection with FIGURE 16, provides an inherent torque tending to wind the tape on each spool and accordingly this system operates with no tape slack at any point.

Since the erase head is energized during the recording operation, erase head 730 is spaced from recording head 712 by a distance along the tape path sufficient to prevent any signal interference.

A physical embodiment of the recorder unit is illustrated in FIGURES 18 through 26 and will be considered in two sections, the first describing the mechanisms for causing recording head 712 to move from its starting position at one edge of the tape across the tape and back to its starting position for each character transmitted and the second section being directed to those mechanisms responsible for advancing the tape at a time when the recording head is not energized. FIGURES 18 and 19 are top and front views respectively of the recorder unit. FIGURE 19 shows the tape spools 704 and 706 and tape driving sprocket wheel 702 (in dotted lines) as well as the associated tape rollers in positions corresponding to those shown in FIGURE 13, and the same reference numerals have been used throughout for identifying corresponding parts.

*Recorder-recording head movement mechanism*

All of the parts in the recorder unit are mounted on a frame (see FIGURES 18 and 19) which may be of a metal such as aluminum and which has a right end member 734, a left end member 736 and a central member 737 including an off-set rear portion 738 best shown in FIGURE 18. Members 736 and 737 are integrally joined by longitudinally extending sections 739 and 740 forming a first rectangle. Member 737 is joined near the front end by member 741 which curves to become integral with right end member 734. At the off-set rear portion 738 a similar member 742 is provided which also curves to become integral with member 734. About one-fourth of the distance between front member 741 and rear member 742, as shown in FIGURE 18, is a third longitudinally extending bar 743 which connects central member 737 and right end member 734 at a lower elevation as is shown in FIGURE 19. Three frame mounting supports 744, 745 and 746, best seen in FIGURES 19–21, are provided for supporting the recorder frame in a suitable housing (not shown).

Tape feed spool 704 and take-up spool 706 are both suitably mounted on shafts which are supported by the frame as best shown in FIGURES 18, 19 and 21 and, as mentioned above, no additional auxiliary driving means is provided. Tape roller 710 is mounted on bracket 711 which is rigidly secured to the frame in a suitable manner. Roller 714 which is under the recording head is supported on lever 725 which is pivotally mounted on bracket 711 by a pin 726. Stud screw 728 is threadedly received in a lower portion or extension of bracket 725 and is connected to one end of spring 727. The other end of spring 727 is connected to pin 729 which in turn is secured to fixed bracket 711. Adjustment of screw 728 varies the force applied by spring 727 through bracket 725 to roller 714 under recording head 712 to adjust the pressure between recording head 712 and the tape. Erase head 730 is mounted on arm 732 which is pivotally supported on pin 733. Pin 733 and roller 710 are mounted along the same axis and are supported on the frame by bracket 711.

As most clearly shown in FIGURE 18, cam shaft 747 extends longitudinallys of the frame and is journalled at one end in a suitable bearing 748 in right end frame member 734 and at its other end in a similar bearing 749 in left end member 736, and is secured in position as by means of collar 751. Mounted on cam shaft 747 near rgiht end frame member 734 are two cams 750 and 752. Cam 750 is a tape feed cam and cam 752 is a sensing lever trip cam.

Cams 750 and 752 are also shown in FIGURES 24 and 25. In FIGURE 24 the positions of cams 750 and 752 have been interchanged from their actual position as shown in the other figures solely for the purpose of simplifying the sketch which is provided to illustrate the functional operation of the various mechanisms associated with the cams. These cams are part of the tape feed mechanism and are discussed in detail below.

Referring now to FIGURES 18 and 22, there is provided near the end of the cam shaft 747 adjacent left frame member 736 a stop wheel 754 rigidly secured to the cam shaft. Stop wheel 754 has a projection 756 which abuts against stop bar 757 on stop arm 758. Stop arm 758 is pivotally mounted on fixed pin 760 and biased to its illustrated position by spring 762. Rigidly secured to stop arm 758 is an armature 764 for solenoid 766. Solenoid 766 is suitably mounted on frame member 736 as by bracket 768, also shown in FIGURES 19 and 21. Energization of solenoid 766 causes stop bar 757 to be retracted from stop wheel projection 756 to allow stop wheel 754 and cam shaft 747 to rotate.

Gear 770 is mounted for free turning movement on cam shaft 747 and is adapted to drive cam shaft 747 through a friction clutch comprising a pair of felt discs 772 and 774, metal friction disc 776 mounted to slide along and to turn with the shaft 747, a spring 778 and a dog 780 which is adjustably secured to shaft 747. Shuttle cam 782 is rigidly secured to cam shaft 747 and a portion of surface 784 which contacts felt discs 774 acts as the fixed friction disc of the friction clutch. In operation, spring 778 urges friction disc 776 toward surface 784 on the shuttle cam thereby pressing felt discs 772 and 774 against the faces of rotating gear 770 to provide a turning torque for cam shaft 747.

Motor 786 (B502, FIGURE 4), shown also in FIGURE 19, is secured to the frame and operates continuously when the equipment is turned on. Gear 770 is continuously driven by means of pinion 788 on motor 786 (B502) through a fixed gear train including gear 790 and pinion 792.

Referring now to FIGURES 18 through 22, and more specifically to FIGURE 22, an E shaped support plate 794 is secured to the frame at opposite sides as with fasteners 796 to extend above the frame and magnetic tape. Four stud rollers 797, 798, 799 and 800 are secured to plate 794. The rollers have V-shaped grooves and are mounted in alignment to receive a rectangular plate 802 having complementary V-shaped edges. Plate 802 rests on rollers 797 and 798 and is movable laterally to the direction of tape movement. The magnetic recording and reading head assembly 712 is removably secured to plate 802 by screws 804.

As best shown in FIGURES 19, 22 and 26, a shuttle lever assembly 806 is pivotally mounted about fixed pin 808 on the center leg of E-shaped support plate 794. Shuttle lever assembly 806 has a main arm 810 which contains, near its upper end, an elongated slot 812 for receiving a pin 814 which is rigidly secured to movable plate 802. Arm 816 is secured as by screws 818 and spacer 817 to main shuttle arm 810 and carries at its upper end a contact 819 which acts as a commutator wiper.

Referring now to FIGURES 18, 19, 22 and 26, the lower end of shuttle lever assembly 806 contains a roller follower 819 which cooperates with the cam surface in shuttle cam 782. As shuttle cam 782 rotates, shuttle lever arm 806 pivots about pin 808 driving plate 802 along rollers 797 through 800 and causing recording head assembly 712 to move laterally of the recording tape. Switch contacts S–502 shown in FIGURE 18 are suitably mounted on plate 794 to be closed when plate 802 has returned to its rest position.

Referring to FIGURES 19, 21 and 23, on the upper part of support plate 794 is mounted a commutator bracket 820, the top view of which is shown in FIGURE 23. A group of commutator contact strips 822 made of a conducting material such as Phosphor bronze are spaced apart with nylon spacers 824 sandwiched therebetween. The contact strip and spacer assembly is provided with two spaced through holes into which an insulating sleeve 826 of a material such as Bakelite is inserted. Bolts 828 are then inserted through sleeves 826 and the assembly secured to bracket 820. Additional end spacers 827, preferably of insulating material, are used to rigidly locate contact strips 822 between the arms of bracket 820.

The spacing between contact strips 822 determines the spacing between adjacent channels of recorded data on the tape and with contact strips 822 positioned as illustrated in FIGURE 23, a total of ten channels of information could be recorded on the usable space on a tape having a width of seven eighths of an inch. However, only the five contacts actually used are shown. Because of the close spacing between commutator strips 822, alternate lugs 830 and 832 are located at different elevations to facilitate connecting the electrical conductors used to supply the coded electrical signals to the commutator strips.

A tension spring 834 shown in FIGURES 19 and 22 is connected between fixed plate 794 and movable plate 802. Spring 834 is connected to one end to pin 814 on plate 802 and at the other end to pin 836 so that when the recording head is in its rest position as illustrated, the spring is under tension and its force is available to aid in driving recording head 712 across the tape at a substantially uniform velocity during the interval of the actual recording or reading operation.

The velocity of head 712 during the reading operation affects the strength of the signal induced by the magnetized area on the tape. For this reason a uniform velocity during the actual reading interval for each cycle of operation is desirable. The force supplied by spring 834 reduces the load on shuttle cam follower arm 810 at the time shuttle cam 782 and cam shaft 747 are being accelerated from zero velocity thus reducing the power required from motor 786 thereby permitting a smaller motor to be used.

As most clearly shown in FIGURES 19 and 21, a support bracket 837 is supported on right end frame member 736 and carries electrical terminal connector 838 for electrically connecting the recorder unit with the other pieces of equipment in the over-all teletypewriter system. Various electrical componets such as capacitors and resistors may be mounted on the frame of the recorder units as desired with one such capacitor being indicated at reference numeral 840.

*Recorder-tape feed mechanism*

Referring now to FIGURES 18, 20, 24 and 25, tape feed sprocket wheel 702 is mounted to turn with line shaft 850 which is mounted for rotational movement with one end journalled in bearing 851 in longitudinal frame member 741 and the other end journalled in bearing 853 in longitudinal frame member 742. Also rigidly mounted on shaft 850 is ratchet wheel 852 with teeth uniformly spaced around its entire periphery. Function disc 858 is loosely mounted on line shaft 850 on opposite sides of function disc 858. Function friction disc 860 is movable along but mounted to turn with shaft 850 and is biased against felt disc 856 by function disc spring 862 and drived dog 864, the latter being secured to shaft 850 as with set screw 866. One face of ratchet wheel 852 is used as the friction disc fixed to turn with shaft 850. Function disc 858 changes position when the direction of rotation of shaft 850 is changed and is in the position illustrated in FIGURE 24 during recording or playback operation and shifts counterclockwise through an angle of approximately 20° or 30° to its alternate position when shaft 850 turns counterclockwise.

Referring to FIGURES 18, 19, 20 and 25, a shaft gear 870 is mounted for free rotational movement on line shaft 850 and drives shaft 850 through a friction clutch comprising the usual felt discs 872 and 874, a shaft friction disc 876 which is secured to shaft 850 and a friction disc 878 which turns with but is slidable along shaft 850. Friction disc 878 is urged toward friction disc 876 by spring 880 and dog 882.

A reversible electric motor 868 (B501, FIGURE 4) is secured to the frame and is provided with a pinion 884. Drive shaft gear 870 is driven continuously in the direction shown by the arrow in FIGURE 19 during recording or playback operation of the equipment by pinion 884 through a fixed gear train best shown in FIGURE 20 comprising a gear 886 and pinion 888 on a fixed shaft 890.

With continued reference to FIGURE 24, the rotation of shaft 850 is controlled by ratchet wheel 852 and escapement pawl 892 during the normal recording or reading operation. An upper finger 894 on pawl 892 is normally engaged with a tooth on ratchet wheel 852 and lower finger 896 is in a non-tooth engaging position. Escapement pawl 892 is mounted for pivotal movement about pin 898 which is supported on rotation function lever 900. Escapement pawl 892 is biased in its normal position by spring 902 which is connected at one end near lower finger 896 and on the other end to a spring holding pin on rotation function lever 900. Stud 904 is threadedly received by ear 905 on rotation function lever 900 to adjust operation of the escapement pawl.

The upper arm 894 on escapement pawl 892 is released from ratchet wheel 852 by escapement pawl function lever 906 which is pivotally mounted on fixed pin 908. As cam shaft 747 rotates, nose portion 910 of escapement pawl function lever 906 is caused to rise, thereby forcing the other end of the function lever down against arm 912 of ratchet pawl 892 to force upper finger or arm 894 out of engagement with the teeth on ratchet wheel 852 and to force lower finger 896 into engagement with a ratchet wheel tooth. As function lever 906 returns to its illustrated position, spring 902 pulls ratchet pawl 892 back to its illustrated position. Because of the continuous rotational torque applied to shaft 850 through the friction clutch associated with shaft gear 870, the ratchet wheel advances one tooth for each revolution of cam shaft 747.

Rotation function lever 900 is pivotally mounted about fixed pin 914 and has an arm 916 which fits a considerable distance into a slot in function disc 858 to prevent the function disc from rotating. During the normal recording or reading operation, arm 916 on rotation function lever holds function disc 858 in the illustrated position. Reversal of rotation of line shaft 850 causes function disc 858 to rotate a small distance counterclockwise, thereby causing rotation function lever 900 to pivot about pin 914 and pull the entire escapement pawl 892 away from the ratchet wheel. The angular displacement of function disc 858 is controlled by arm 916, and as soon as line shaft 850 begins rotating again in a clockwise direction, function dsc 858 will return to its illustrated position if arm 916 is free to move. Arm 918 on rotation function lever 200 abuts against adjustment screw 919 which is provided to adjust the operating position of rotation function lever 900 which in turn controls the position of escapement pawl 892 with respect to ratchet wheel 852.

Below arm 918 on rotation function lever 900, a trip lever 920 is mounted for pivotal movement about fixed pin 922. Trip lever 920 has an arm 924 which is adapted to cooperate with the notched end of arm 918 on rotation function lever 900 when line shaft 850 rotates in a counterclockwise direction. Spring 926 tends to bias arm 924 toward arm 918 to cause rotation function lever 900 to be locked in its alternate position during counterclockwise rotation of shaft 850. Trip lever 920 has a second arm 928 spaced below extension 930 on tape sensing lever 932 which is pressed downwardly to unlatch notched arm 918 on rotation function lever from arm 924 when locked.

Tape sensing lever 932 has a centrally located elongated slot 934 which allows tape sensing lever 932 to have a pivotal movement about fixed pin 936 and axial movement in the direction of the major axis of slot 934. Tape sensing lever 932 has a nose portion 938 which is biased by spring 942 against the edge of tape 708 and/or rim 940 of tape feed sprocket wheel 702. A switch contact operating pin 944 is located adjacent nose 938 and a trip lever pin 946 is provided on an arm extending outwardly from slot 934.

Tape feed sprocket wheel 702 has a width slightly less than the width of tape 708. The teeth on sprocket wheel 702 and the holes in tape 708 are located so that the edge of the tape and rim 940 are flush. Rim 940 does not extend completely around wheel 702 and when either notch 718 or 720 (see FIGURES 14 and 15) advances to sprocket wheel 702, tape sensing lever 932 moves inwardly, thereby opening contacts of switch S–503 and closing the contacts of S–505. The tape notches 718 and 720 are located to always have the same position on tape feed sprocket wheel 702 and the distance between surfaces 721 and 722 of notch 720 is equal to the peripheral distance between surfaces 947 and 948.

At the end of the tape during a recording operation, the recorder unit stops when tape sensing lever 932 moves into notch 718 due to an electrical interlock caused by opening of contacts S–503. However, when the tape is being rewound, the electrical interlock is not operative. When tape sensing lever moves into notch 720 (see FIGURE 15) of the tape, tape feed sprocket wheel 702 is mechanically stopped by nose 938 abutting simultaneously against edge 721 of tape 708 and surface 947 of rim 940 on sprocket wheel 702.

The width of tape feed sprocket wheel 702 is such that edge 723 of tape 708 normally overhangs the rim of wheel 702 and edge 719 is flush with the edge of the rim of wheel 702. Switch contact S–504 has an actuator 945 which engages edge 723 of tape 708, so that switch S-504 is normally held open by the overhanging edge 723 of the tape and is closed when the tape notch 719 advances on sprocket wheel 702 to a position in which switch actuator 945 engages notch 719. Closing of switch S–504 is effective to energize the end of tape warning light I-702 on the keyboard unit.

Lower extension 930 on tape sensing lever 932 is not moved out of engagement with arm 928 on trip lever 920 by pivotal movement of tape sensing lever 932 except at one interval near the beginning of the recording operation. Clockwise movement of tape sensing lever 932 as seen in FIGURE 24 is caused by spring 942 when nose 938 comes in contact with a notch or recess in the side of tape 708 along a portion of tape feed sprocket wheel 702 which does not have rim 940. Counterclockwise movement of tape sensing lever 932 can be caused by moving pin 946 upwardly.

Tape sensing lever 932 is subjected to one additional movement which occurs when surface 948 of rim 940 on the tape feed sprocket wheel abuts the upper edge of nose 938 thereby forcing tape sensing lever 932 downwardly and blocking further rotation of line shaft 850 irrespective of the operation of the remaining mechanisms.

Tape sensing trip lever 950 is mounted for pivotal movement about fixed pin 952 and biased by spring 954 so that in normal operation end 956 will not contact pin 946 on tape sensing lever 932. The opposite end 958 of trip lever 950 is biased against the surface of cam 752 on cam shaft 747. When referring to the figures in the drawings other than FIGURE 24, it should be kept in mind that the positions of cams 750 and 752 on shaft 747 have been reversed in FIGURE 24 for clarity of representation.

As cam shaft 747 and cam 752 rotate, end 958 of tape sensing trip lever 950 is gradually pressed downwardly thereby causing end 956 to move upwardly and to almost contact pin 946. Only when tape sensing lever 932 is moved downwardly by surface 948 on tape sprocket wheel 702 does the upward movement of lever 950 cause tape sensing lever 932 to rock about pin 936. The rocking movement causes nose 938 to back away from the edge of sprocket wheel 702 and permits advancement of the tape.

*Recorder operation*

When the recorder unit is turned on and ready for operation, motor 786 is continuously energized thereby causing gear 770 to continuously rotate and provide a constant driving torque through its associated friction clutch tending to cause cam shaft 747 to rotate. Stop wheel 754 normally holds cam shaft 747 stationary. When an electrical impulse is applied to solenoid 766, stop bar 757 is momentarily retracted from its contacting position wtih stop wheel 754, allowing cam shaft 747 to make one revolution.

Shuttle cam 782 is normally stopped at the top of the rise in its cam surface so that immediately upon release of stop bar 757 from stop wheel 754, shuttle cam follower 819 causes shuttle lever assembly 806 to start its reciprocating movement and drive plate 802 which is mounted in the groove rollers 797 through 800 laterally with respect to recording tape 708. Recording head 712 is supported on plate 802 and is thus rapidly driven across the tape because of the contour of the cam track in shuttle cam 782 (see FIGURE 26) and spring 834.

As the recording head 712 is moved across the tape, commutator contact 818 is simultaneously moved across commutator contact strips 822 to sequentially apply the coded signals representing each letter or character to be transmitted to recording head 712.

The recording operation takes place during the very first part of the revolution of cam shaft 747 and the motion of recording head 712 with respect to tape 708, which is stationary during this time, is very rapid so that during the reading operation an induced signal picked up by recording head 712 will be large enough to drive an amplifier.

During the remaining period of the rotation of cam shaft 747, shuttle lever assembly is moved back to its normal position against the bias of spring 834.

Operation of the tape feed mechanism will be best understood with reference to FIGURE 24. Shaft gear 870 is continuously driven by motor 868 to apply a continuous driving torque through a friction clutch to shaft 850 tending to advance the tape feed sprocket wheel 702. As cam shaft 747 rotates one revolution, ratchet pawl function lever 906 causes upper tooth 894 of escapement pawl 892 to come out of engagement with the teeth on ratchet wheel 852 just as lower pawl tooth 896 comes into engagement with a tooth on ratchet wheel 852. This permits tape feed wheel 702 to advance part of its distance with the final advancement occurring when nose 910 of ratchet pawl function lever 906 drops to the position illustrated in FIGURE 24, which action occurs just prior to the instant that cam shaft 747 is stopped by stop wheel 754 and stop bar 757. This action causes upper tooth 894 of escapement pawl 892 to be forced into the path of the next tooth on ratchet wheel 852 by spring 902. In the illustrated embodiment, the number of teeth on ratchet wheel 852 is chosen so that the tape moves a distance of .075 inch between each recording operation.

As long as tape sensing lever 934 is held in its illustrated position due to the presence of un-notched tape on tape feed sprocket wheel 702, tape sensing trip lever 950 on cam 752 does not affect normal operation.

Referring now to FIGURE 18, switch contacts S–502 are mounted to be closed when plate 102 is in its starting position and to be open during a time interval required for rotation of cam shaft 747. These switch contacts form part of an electrical interlock which prevents the next starting impulse from being applied to solenoid 766 until cam shaft 747 has made its complete revolution.

Referring now to FIGURES 14 and 18, the above described cycle of operation continues until notch 719 in tape 708 passes onto tape feed sprocket wheel 702. At that time normally open switch contacts S–504, also shown in FIGURE 24, close to complete a circuit to energize an indicating light I–701 on the keyboard thereby providing a warning signal to the operator that the end of the tape is approaching.

Operation of the keyboard can continue, however, until notch 718 is reached. At this point tape sensing lever 932 moves inwardly to open switch contacts S–503. Switch contacts S–503 are in series with switch contacts S–502 and so long as either set of contacts is open, electrical impulses cannot be applied to start solenoid 766 thereby preventing further advancement of the tape and blocking entry of additional letters in the keyboard.

The operator is provided with a rewind switch which reverses the direction of motor 868, thereby reversing direction of rotation of shaft gear 870 and shaft 850. During the rewind operation it is immaterial whether motor 786 is energized as the rewinding operation is controlled completely by mechanisms associated with shaft 850, and stop wheel 754 is never released.

As shaft 850 begins turning counterclockwise as seen in FIGURE 24, function disc 858 is immediately turned counterclockwise through its associated friction clutch thereby causing the rotation function lever 900 to pivot about pin 914 thus backing escapement pawl 892 away from ratchet wheel 852 to permit a rapid continuous rewind operation. Near the end of the rewind operation notch 720 in the recording tape (see FIGURE 15) becomes aligned between surfaces 947 and 948 of rim 940 on tape feed ratchet wheel 702. Tape sensing lever 932 is urged into notch 720 of the tape by spring 942 and the lower edge of nose 938 of the tape sensing lever soon abuts against surface 947 of rim 940 thus causing rotation of tape feed sprocket wheel 702 to stop. Motor 868 continues to urge rotation of shaft 850 through gear 870 and its associated friction clutch until the rewind switch in the control box is de-energized.

When tape sensing lever 932 moves into notch 720 on the tape, switch contacts S–505 are then closed and energize light I–602 in the control box where the reset sensing switch is located to indicate that the rewinding operation has been completed. Opening of contacts S–503 does not affect operation of the equipment at this point.

When it is desired to either record on the magnetic tape or playback a previously recorded message, power is again applied to motors 786 and 868 to cause continuous rotation in the directions indicated in the drawings. Arm 924 on trip lever 920 has by this time locked in the notch in arm 918 on rotation function lever 900, thereby holding rotation function lever 900 in its alternate position with escapement pawl 892 out of operative engagement with ratchet wheel 852. The tape is thus allowed, upon application of power to motor 868, to advance to the point where nose 938 on tape sensing lever 932 contacts surface 948 on rim 940 of tape feed sprocket wheel 702. This allows the tape to advance a distance slightly greater than the distance between erase head 730 and recording head 712.

If the subsequent operation is a read or playback operation, erase head 730 is not energized. If the subsequent operation is a record operation, erase head 730 is energized at the time the direction of motor 868 is reversed to start the erasing function during the movement of tape feed sprocket wheel 702 to the position determined by abutment of surface 948 against nose 938. This deletes any previous signals recorded on the tape in the first few inches in preparation for the subsequent recording operation during which time, of course, the erase head 730 remains continuously energized.

Recapitulating, prior to the start of the recording operation, it is necessary to rewind the tape so that the first tape recording position has passed erase head 730 toward feed spool 704. As soon as the equipment is turned on for either a read or record operation, the tape rapidly advances to a position where the first line adapted to receive recorded data is immediately beneath recording head 712. If a recording operation is indicated, erase head 730 clears the first section of tape as the tape is advanced to the position where the data is to be recorded.

Referring again to FIGURE 24, when surface 948 comes into contact with the upper portion of nose 938 on tape sensing lever 932, the tape sensing lever is forced down so that the upper surface of slot 934 bears against pin 936. Lower extension 930 on tape sensing lever 932 then forces arm 928 on trip lever 920 downwardly thus pulling arm 924 out of the notch on the end of arm 918 on rotation function lever 900. Rotation function lever 900 still remains in its alternate position however, as it will not be returned to its illustrated position until function disc 858 forces arm 916 downwardly. Function disc 858 cannot be driven in forward direction until shaft 850 is allowed to turn. Thus escapement pawl 892 remains out of operative position with ratchet wheel 852 at the time the first character or letter is recorded.

At this point the first letter to be recorded is entered in the keyboard and the start pulse is applied to solenoid 766 as described above. Recording head 712 advances across tape 708 during the first fraction of rotation of cam shaft 747 and ratchet pawl function lever 906 contacts arm 912 on escapement pawl 892 as cam 750 rotates. As cam 752 rotates tape sensing lever 950 is pivoted about pin 952 with end 956 contacting pin 946 on tape sensing lever 932. Since surface 948 on rim 940 of tape feed sprocket wheel 702 is in contact with the upper surface on nose 938, tape sensing lever 932 is in a lower than normal position with pin 946 contacting the upper surface of 956 so that with the rise given to end 956 of tape sensing trip lever 950 as cam 752 rotates, the tape sensing lever 932 is moved out of engagement with surface 948 of rim 940 on tape drive wheel 702.

Shaft 850 begins to rotate thus causing function disc 858 to promptly return to its illustrated position thereby moving rotation function lever 900 against stop 919 and positioning escapement pawl 892 in operating position with respect to ratchet wheel 852. As cam 750 returns to its illustrated position the upper tooth 894 on escapement pawl 892 locks in position on ratchet wheel 852 and the recorder unit is then ready for the next letter from the keyboard.

At the time surface 948 of rim 940 on tape sprocket wheel 702 contacts nose 938 on tape sensing lever 932 and forces the top of slot 934 against fixed pin 936, pin 944 which is carried by lever 932 drops below the contacts of switches S–503 and S–505 thereby causing those contacts to assume the normal position just as if a full width of tape is present under tape sensing lever 932. This allows contacts S–503 to close to permit the next electrical impulse to be applied to solenoid 766 when the second letter to be recorded is entered in the keyboard.

Because of the force between surface 948 and nose 938 caused by the torque supplied to shaft 850 through the friction clutch associated with shaft gear 870, tape sensing lever 932 pivots about pin 936 before returning upwardly to its illustrated position. This permits pin 944 to be rocked counterclockwise as seen in FIGURE 24 considerably beyond its normal position so that pin 944 clears the ends of the contacts on switches S–503 and S–505 to return the equipment to the position illustrated in the drawings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a recording apparatus comprising a tape feed reel, a tape take-up reel, a magnetic tape extending from said feed reel to said take-up reel, a recording head in operative relation with said tape, an erase head operatively associated with said tape and spaced from said recording head, means for recording information across the width of the tape by said recording head while said tape is stationary, means for advancing said tape in step increment movements following each recording operation, a mechanism for disengaging said means for advancing tape in step increment movements during the rewind operation of the tape, and means locking said mechanism in operating condition at the beginning of a recording or playback operation following completion of the rewind operation to enable the tape to advance a distance at least as great as the distance between the erasing head and the recording head before energizing the recording head.

2. In a recording apparatus as defined in claim 1, said tape take-up reel and said tape feed reel being mounted for free rotation about parallel axes spaced apart a distance less than the length of said magnetic tape, said magnetic tape comprising a resilient magnetic record tape so preformed as to intrinsically coil upon itself and extending between said reels with the opposite ends thereof engaging said reels whereby the ends of said tape intrinsically tend to wind upon said reels, and said means for advancing said tape is disposed between said reels and engages said tape for feeding said tape from one of said reels to the other.

3. A recorder having a tape feed reel, a tape take up reel, a magnetic tape on said reel, a recording head operatively associated with said tape and means for driving said tape in one direction with an intermittent motion and for driving the tape in the opposite direction with a continuous motion; said tape drive comprising a source of rotative power, a friction clutch, a ratchet wheel mounted to turn with said tape, means connecting said ratchet wheel to said source of power through said friction clutch, a ratchet pawl in operative relation with said ratchet wheel and means connected between the recording head and the ratchet pawl for synchronizing the transducing function of said recording head with the operation of said ratchet pawl.

4. In the recorder as defined in claim 3, further having a rotation function lever mounted to have alternate positions determined by the direction of rotation of said ratchet wheel, said rotation function lever in one of its alternate positions being operative to disengage the rachet pawl from said ratchet wheel.

5. In a recorder unit having a tape feed reel, a tape take-up reel, a magnetic tape on said reels, a tape drive wheel positioned along the path of the tape between said reels to control the tape feed, a recording head mounted in operative relationship with said tape, an erase head spaced from said recording head toward said tape feed reel, and means effective after rewinding the tape for automatically advancing the tape by a distance at least as great as the distance between said erase head and said recording head and to then stop advancement of the tape.

6. The recorder as defined in claim 5, wherein the tape drive wheel has a recess in one edge along a portion of the periphery whose lineal length is at least as great as the distance between the recording head and the erase head and a similar recess along one edge of the tape near the beginning of the recording area on the tape, and said means includes a tape sensing lever adapted to cooperate with said recesses upon coincidence to mechanically stop the rewind motion of the tape and upon forward rotation of the tape drive wheel permit the tape to advance a distance at least as great as the distance between the erase head and the recording head.

7. A recorder comprising: a tape feed reel, a tape take-up reel, a magnetic tape on said reels, a recording head operatively associated with said tape and means for driving said tape in one direction with an intermittent motion and for driving the tape in the opposite direction with a continuous motion; said means comprising a shaft drive connected to said take-up reel, means supplying a torque to said shaft tending to cause rotation, a toothed escapement wheel secured to said shaft, a rotation function lever mounted for pivotal movement about a fixed pivot, a pawl mounted adjacent said escapement wheel and supported on said rotation function lever, and a function disc adapted to be driven between two alternate positions determined by the direction of rotation of said shaft, said disc controlling the position of said rotation function lever to cause said pawl to be operatively associated with said escapement wheel when the torque urges shaft rotation in one direction and to be moved out of operative relationship when the torque urges shaft rotation in the other direction.

8. The combination as defined in claim 7, further comprising a friction clutch on said shaft, said function disc being supported on said shaft and driven by said clutch and said clutch comprising a pair of friction discs on opposite faces of said function disc with one of said friction discs abutting the face of said escapement wheel and resilient means urging said function disc toward said escapement wheel.

9. Magnetic tape transducing apparatus including first driving means for intermittently moving the tape step by step in a lengthwise direction, the tape having a plurality of parallel signal tracks arranged at an angle to the direction of tape movement, a magnetic signal transducing device cooperating with the tape, second driving means operable to reciprocate the transducing device across the tape in a direction parallel to the signal tracks, signal operated control means for the second driving means, the control means being responsive to each signal applied thereto to render operative the second driving means to reciprocate the transducing device once across the tape, a signal storage device operating in synchronism with said second driving means and signal transfer circuits interconnecting the transducing device and the storage device and effective to set the storage device in accordance with signals read from the tape by the transducing device during said reciprocating movement.

References Cited by the Examiner

UNITED STATES PATENTS

| | | | |
|---|---|---|---|
| 2,038,182 | 4/1936 | Linder | 192—54 |
| 2,057,761 | 10/1936 | Bolton | 192—54 |
| 2,167,188 | 7/1939 | Schaarwachter et al. | 179—100.2 |
| 2,475,694 | 7/1949 | Camras | 179—100.2 |
| 2,648,589 | 8/1953 | Hickman | 340—174.1 |
| 2,672,300 | 3/1954 | Hogan | 242—57.1 |
| 2,946,532 | 7/1960 | Carter | 242—57.1 |
| 2,964,324 | 12/1960 | Brasseur | 179—100.2 |
| 2,986,725 | 5/1961 | Dirks | 340—174.1 |
| 3,016,522 | 1/1962 | Louxie et al. | 340—174.1 |
| 3,020,356 | 2/1962 | Barry | 179—100.2 |
| 3,050,594 | 8/1962 | Bick et al. | 179—100.2 |

FOREIGN PATENTS

| | | |
|---|---|---|
| 877,126 | 11/1942 | France |

BERNARD KONICK, *Primary Examiner*.

IRVING SRAGOW, JAMES W. MOFFITT, R. A. CAHILL, *Examiners*.

M. K. KIRK, A. I. NEUSTADT, R. M. JENNINGS *Assistant Examiners*.